United States Patent [19]
Douglas

[11] Patent Number: 5,335,313
[45] Date of Patent: Aug. 2, 1994

[54] VOICE-ACTUATED, SPEAKER-DEPENDENT CONTROL SYSTEM FOR HOSPITAL BED

[76] Inventor: Terry L. Douglas, 909 Norfolk Rd., Livermore, Calif. 94550-1814

[21] Appl. No.: 801,257

[22] Filed: Dec. 3, 1991

[51] Int. Cl.⁵ ............................................... G10L 7/08
[52] U.S. Cl. .................................. 395/2.84; 395/2.55; 395/2.6
[58] Field of Search ................... 381/29–51; 395/2; 364/413.01–413.04; 128/630

[56] References Cited

U.S. PATENT DOCUMENTS

| | | | |
|---|---|---|---|
| 3,921,048 | 11/1975 | Padgitt | 318/480 |
| 4,207,959 | 6/1980 | Youdin et al. | 395/2 |
| 4,768,088 | 8/1988 | Ando | 364/550 |
| 4,776,016 | 10/1988 | Hansen | 395/2 |
| 4,838,275 | 6/1989 | Lee | 128/670 |
| 4,933,873 | 6/1990 | Kaufman et al. | 395/2 |
| 5,036,462 | 2/1991 | Kaufman et al. | 364/413.01 |
| 5,086,385 | 2/1992 | Launey et al. | 364/189 |

OTHER PUBLICATIONS

Quartet Technology, Owners Manual for "The Series Five" voice recognition environmental control unit with speech synthesis (1991).

*Speakeasy*, The Newsletter of Scott Instruments, "Voice Controlled Hospital Unit Provides VIP Treatment" (1991).

*Primary Examiner*—David D. Knepper

[57] ABSTRACT

A voice-actuated environmental operator system of the kind which enables a user/patient to use simple voice commands to control a plurality of hospital environment room functions including operation of selected bed movement and room environment functions associated with a provided multi-function hospital bed. The operator system uses a conventional IBM PC, XT, AT or like computer which has been adapted for interfacing in a pass-through manner with the control unit of a provided hospital bed. The computer includes a voice card and associated voice recognition and training software for interpreting and translating voice input into digital information readable by a controller card for operating a plurality of bed motor and room function commands. The controller card includes a plurality of relay switch devices, each of which are dedicated to performing a specific bed movement or room function. An FCC registered data access arrangement is also provided to the controller card for telephone interface capability. In a first embodiment, data communication between the computer and the provided hospital bed's control unit is by pass-through hard wire cable interface connection between bed control unit and the DB9 and DB15 serial port connectors on the back of the computer. The DB9 and DB15 serial port connectors are desoddered off the computer's motherboard and wired directly to the controller board. A headset microphone assembly wearable by a patient user is provided to the system for transmitting voice input to said voice recognition means and receiving system command confirmation signals and telephone communications.

26 Claims, 17 Drawing Sheets

Input To Voice Card

To Nurse Station

VOICE-ACTUATED, SPEAKER-DEPENDENT CONTROL SYSTEM FOR HOSPITAL BED

FIELD

The present invention relates generally to room environment control More particularly, the invention relates to a voice-actuated, speaker-dependent control system for use in connection with a hospital bed. The system permits the patient to control his or her hospital room environment, including various patient-related devices driven by activating units, such as motors, etc., by simple voice commands in order to operate the traditional room environment control features of existing motorized hospital beds including adjustment of the head up/down positions and leg up/down bed positions, operation of the overhead bed light, activation of the nurse call, and operation of the entertainment features (television and/or radio). Additionally, the invention includes a telephone interface which permits the patient to operate the telephone through voice command.

BACKGROUND

Although designed for comfort, a hospital bed can be a very uncomfortable place to be. Simple tasks, such as adjusting the bed, turning on a light or changing the channel on the TV, can become major frustrations for the patient and time wasters for the nursing staff if the patient must constantly call for assistance. It is well known that a patient's recovery can be improved dramatically when unnecessary stress and frustration is eliminated. It is also well known that as patients become able to exercise independent control over their own immediate environment, their confidence is restored, and their condition begins to improve more rapidly.

It is known in the art to provide a motorized hospital bed with an on board computer having control means for interfacing with an overhead bed light, nurse call and a TV or radio. These known hospital beds typically include a push-button control panel disposed along one or both sides of the bed which provides most patients with convenient access to these manually controllable functions. However, sometimes the patient has a medical condition, such as, for example, when a patient has suffered stroke, whereby the patient is not able to operate the hand access controls on the bed. For this situation, it is desirable that the room environment control functions be operable by the patient's spoken command.

Voice recognition environmental control units having speech synthesis capability are also known in the art. An example voice recognition environmental control unit is The Simplicity TM Series Five available through Quartet Technology, Inc., of Tyngsboro, MA. The Series Five is directed to home use and includes a specially constructed main control unit which includes conventional phone jacks and an RS-232, microphone and DB25 connector ports. The control unit includes an infrared transmitter and uses known and commercially available infrared operable control modules for remote operation of lights and other appliances through voice command. The special and limited use construction of the main control unit results in an expensive system on the order of $5,000 or more, and accordingly is cost prohibitive to many users.

U.S. Pat. No. 4,838,275, issued to Lee, teaches to provide a subscriber based medical surveillance system whereby a subscriber patient lies or sits on specially adapted furniture, such as a bed or chair, which includes sensors for monitoring a plurality of health parameters. The system includes an elaborate network wherein a subscriber patient's health information is transmitted to, an received by, a third party observer. Responsive to this health information, the observer conducts routine diagnostic sessions and, in case of emergency, facilitates the contact of the appropriate emergency authorities. The system includes two-way voice communication between the patient subscriber and the observer service.

The medical surveillance system of Lee is directed primarily for home use by an ambulatory patient who is otherwise capable of controlling his or her own room environment independent of the surveillance system. This system suffers the disadvantages of being difficult and expensive to implement, especially in view of the amount of specialized equipment that must be purchased or leased by the patient. Also, additional expenses are incurred through the periodic service fees associated with the third party observer and diagnostic service.

While, present technology exists for providing a computer with a voice system for operation of application programs and system functions through spoken commands, prior art attempts to combine voice command capability to existing motorized hospital beds have yet to prove commercially successful.

Accordingly, there is a definite need in the art for a room environment control operator system which is operable by a bed-restricted patient to control, by voice commands, the traditional hospital bed functions, including the up/down positions of the head and leg portions of the bed, the nurse call, the TV and/or radio and room or bed light. It is also desirable that the voice-actuated system include a telephone interface, thus permitting a patient to receive calls or dial out to call emergency numbers or numbers of loved ones. There is also a need for such a system which is low cost and can be easily implemented using readily available components.

THE INVENTION

OBJECTS

It is a primary object of the present invention to construct a voice-actuated hospital environment room operator system which provides a bed-restricted patient more control over the provided hospital bed and room control functions and which overcomes the problems of the prior art.

It is another object of the present invention to provide such a voice-actuated hospital environment room operator system which is low cost and easy to implement and is assembled in large part from conventional and readily available computer and electronic components and which includes interfacing a computer with the existing controls of any provided manufacturer's hospital bed without major modification or alteration to the bed's wiring or logic controls. The computer includes a unique controller card having a plurality of contact reed relay switches for augmented voice control over the conventional hospital bed functions, including voice actuated control of: selected hospital bed motor functions; bed light on/off, TV on/off, TV volume and channel select; and nurse call.

It is another object of the present invention to provide the controller card with an FCC approved telephone interface chip and signal boost means for voice-actuated telephone dial out and receive capability.

It is another object to provide the hospital environment room operator system with a portable nurse station which includes a single convenient one plug disconnectable keyboard and monitor unit for the quick and convenient connection with each system computer so that a plurality of operator systems, each associated with a particular hospital bed, may be handled by a single nurse station.

It is another object to provide the hospital environment room operator system with simple user/nurse interactive menu driven software wherein a nurse merely follows instructions displayed on the nurse station video monitor in response to the patient voice training procedure.

Still other and further objects will become evident from the specification, drawings and appended claims.

DRAWINGS

SUMMARY

Figure 1:
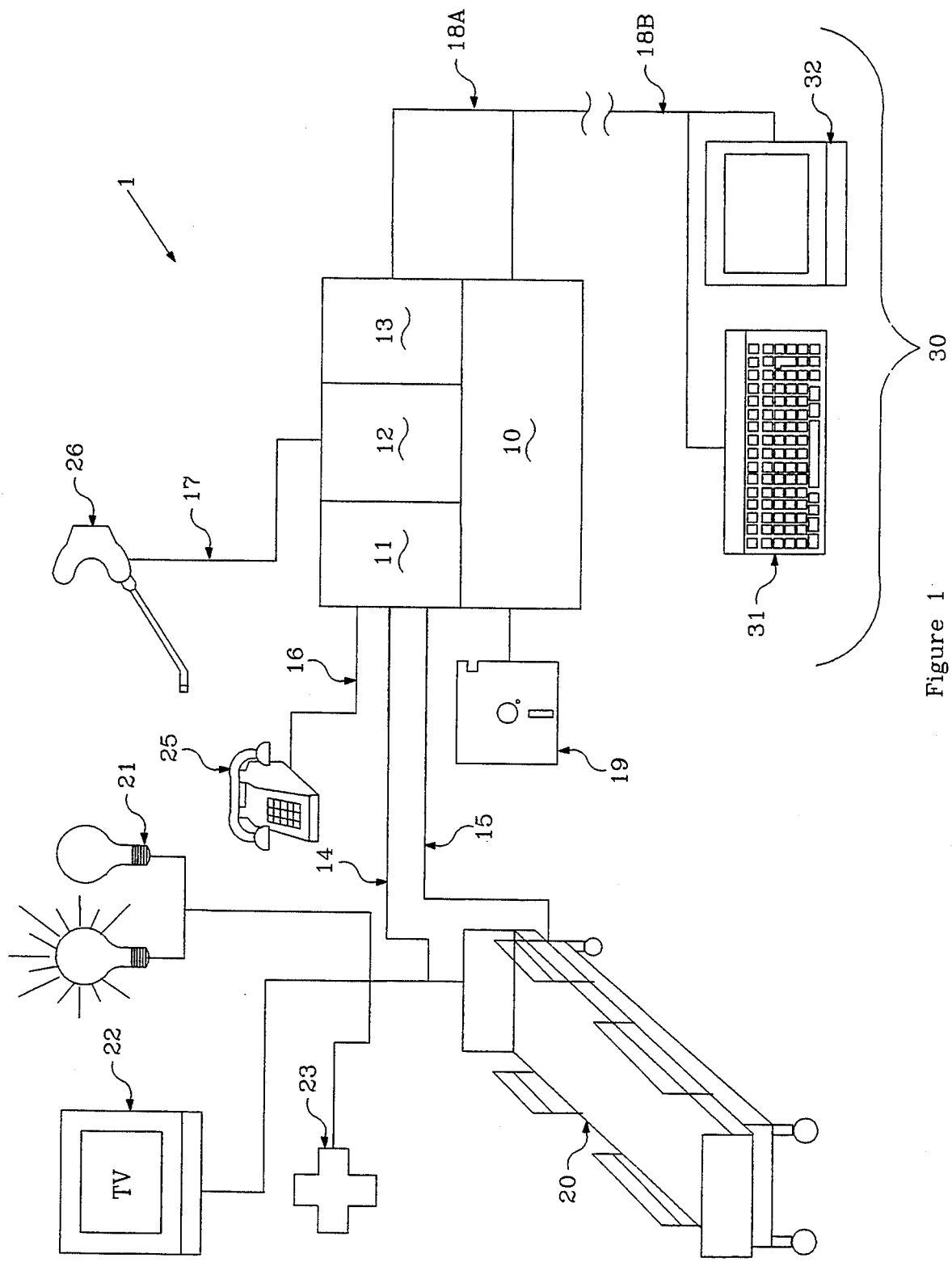
FIG. 1 is schematic view of the hospital room environment control system of the present invention illustrating the physical layout of the individual system components.

A hospital environment room operator system of the type which interfaces voice-actuated computer technology with a provided motorized hospital bed for permitting a patient situated thereon to control the provided bed and room environment functions through simple voice commands. The operator system includes a conventional computer, such as an IBM-PC, XT, AT or like personal computer which is secured to the underside of a provided hospital bed. The computer is provided with a standard graphics/video card or National Television standard code (NTSC) card for supporting a video monitor, television, display device or like item, a voice card for supporting a microphone wearable by the patient and a controller card for controlling selected bed motor functions and for controlling the existing room environment controls associated with the bed, including control of the nurse call, TV and bed light.

A portable nurse station comprising a keyboard and video monitor is included for connection to the computer, and which is operable by a nurse attendant to facilitate the patient during the voice training procedure and during installation of the system software. All of the patient's voice data is saved to floppy diskette, so that if a patient is moved to another bed, the diskette is simply inserted to the computer corresponding to the new bed, thus eliminating the need for re-training the new operator system to the patient's voice patterns.

The video card, voice card, and controller card are connected together in a space saving arrangement by a 3 bus extender which, in turn, is connected to the system bus of the computer. DB9 and DB15 cable connectors are connected from their respective serial ports on the computer's back panel to interface in a pass-through fashion on the control unit on the existing motorized hospital bed. In turn, the DB9 and DB15 serial port connectors are desoddered off from the motherboard and are ribbon cable-connected to the controller board. The DB9 cable is used for transmitting signal information for operating the bed motor functions, including head up/down and leg up/down and the DB15 cable transmits the nurse call, bed light, and TV room environment functions.

The controller card contains a plurality of relay devices, each of which are each assignable to one of the bed motor or room environment functions. To operate a function, the patient speaks the appropriate command into the microphone, whereby the voice input to the voice card is transformed to digital/binary input which is then sent to the controller card for activating the appropriate relay device. This information is then sent to the bed control unit via either the DB9 or DB15 computer-to-bed cable connections to actuate the desired function. The controller card is also provided with an FCC registered data access arrangement for interfacing with a telephone. The data access arrangement also interfaces with an audio gain amplifier circuit in order to boost the signals received from the microphone before it is transmitted through the voice board and into the phone line.

In another embodiment of the invention, infrared or radio frequency data communication means are used in place of the DB9 and DB15 hardwire connectors between the computer and the provided hospital bed.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 is a schematic view showing the overall system layout for a hospital environment room operator (H.E.R.O.) constructed in accordance with one embodiment of the present invention and generally indicated by reference numeral 1. It is understood that the term "hospital environment" is defined as any environment wherein a patient requires the assistance of the H.E.R.O. system of the present invention, including the patient's home environment, a nursing home environment, a retirement home environment or other health care facility environment.

The H.E.R.O. system 1 uses voice-actuated computer technology which interfaces with the user controls of a conventional automated hospital bed to permit a bed-restricted patient to control his or her room environment through simple voice commands. As seen in FIG. 1, the H.E.R.O system 1 generally comprises a computer 10 and a hospital bed 20. The computer 10 is preferably a standard IBM PC, AT, XT or compatible computer which has undergone simple modifications to accommodate a unique controller card which interfaces with the control unit of the provided motorized hospital bed 20. The modifications to the computer 10 will be described in more detail with reference to FIGS. 2 and 3.

In the preferred embodiment of the present invention the provided hospital bed 20 includes a patient operable control consul which permits the patient to operate the on/off control of an overhead bed light 21, or a room light (not shown); the on/off, channel select and volume controls for a TV 22 and/or a radio (not shown); a remote nurse call 23; and a bed motor 24 for adjustment of selected bed functions.

An example hospital bed having the desired patient operable control functions is the "CENTRA-SIDECOM" bed offered through Hill-Rom of Batesville, Ind. (product number 850,852). This type of electrically-operated hospital bed is preferred because of its widespread acceptance in the industry and because of its microvolt operating arrangement for the patient actuated switches (on the order of 12 volts or less) which means a greatly reduced risk of harmful electric shock to hospital personnel or patients. A low voltage system is also preferred since UL approval is not required. However, since a typical PC can handle up to 115 volts, it is understood that other types of hospital beds may be used in combination with the computerized voice-actuated control technology of the present invention, including but not limited to high voltage hospital beds having mechanical, electric, pneumatic, and hydraulic control arrangements or any combinations thereof.

Figure 6A:
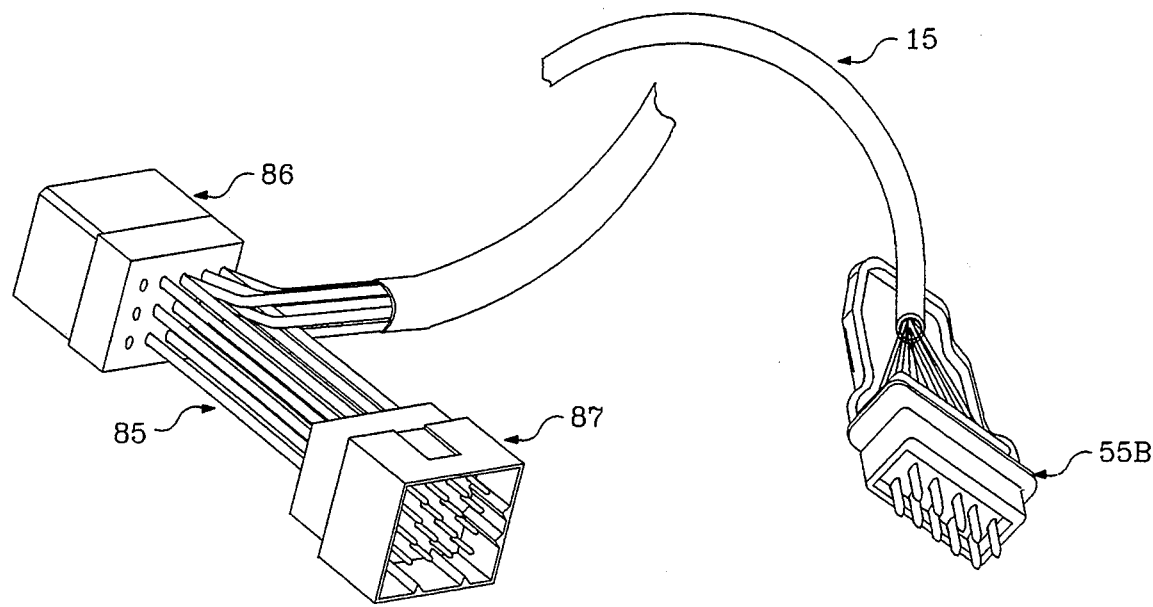
FIG. 6A is an enlarged fragmentary perspective view of a first hospital bed interface cable which connects the DB9 or 9 pin plug connector (serial port) of the personal computer to the motor unit of the hospital bed shown schematically in FIG. 5. FIG. also illustrates the detail of the molex connectors which interfaces in pass-through fashion with hospital bed motor unit.

The computer 10 is provided with at least three expansion slots for supporting a controller card 11, a voice card 12 and a graphics/video card 13. In use, the computer 10 is stored out of the way, tucked under the bed 20 and may be secured thereto by a bracket assembly (not shown). Two computer-to-bed cable connections 14 and 15 are directed from the controller card 11 through the DB9 and DB15 serial port outputs in the back of the computer. The detail for these two connections is discussed below in reference to FIGS. 6 and 7. In the case of the Hill-Rom bed, cable 14 (DB15) interfaces with a provided junction box on the SIDECOM bed control disposed medial of the provided SIDECOM central processing unit and the function switches. Cable 14 carries voice driven commands to control the bed light 21, TV 22 and nurse call 23 function. Cable 15 (DB9) is connected to an existing unit on the bed associated with the bed motor controls to relay voice commands for controlling selected bed adjustment functions.

The voice commands given by the patient are transmitted through a microphone 26 which the patient wears on his or her head. The microphone 26 is preferably in the form of a headset microphone having a lightweight and flat earpiece so that it can be worn comfortably by the patient, even during sleeping. An example of a headset microphone having the above mentioned desired features is the model SHS 174509-01 microphone available through Plantronics of Santa Cruz, CA. While a headset microphone is used in the preferred embodiment, it is understood that any microphone, including but not limited to a lapel microphone, lavier microphone, gooseneck, and any like audio input device may be used with equally good results.

The microphone 26 plugs into a standard RJ11 phone jack (microphone connection) of the provided voice card 12. The voice card 12 is preferably part of a commercially available voice system which includes voice recognition software for learning and continually updating a patient's voice patterns and which translates sound frequencies into digital form which is then recognizable by the operating system of the computer 10 as a keystroke command. After a training period is completed, each command becomes dedicated to a specific function of the H.E.R.O. system.

It is also preferred that the provided voice system have the capability to be trained to a particular person's speech patterns so that a desired command template can be created and stored in the memory of the H.E.R.O. system. Once the voice system is trained, each voice command input is perceived by the operating system of the computer as binary or digital data input associated with a particular keystroke sequence on the keyboard. This data input is then transmitted to the controller card 11, where it is interpreted and acted on to carry out the desired H.E.R.O. system function (ie, either bed movement; bed light on/off; TV on/off, channel select, or volume control; nurse call; telephone; etc.). An example voice system having the desired features is the SRB-LC ™ voice system, a product of STAR KING, INC. of Rancho Santa Margarita, CA. In this system, the J2 connection on the card connects to the exposed 1¼ phone jack or microphone connector 63 (see FIG. 3).

The H.E.R.O. system 1 also includes a portable nurse station 30 which comprises a keyboard 31 and a video monitor 32. When a new patient is introduced to the bed 20, the H.E.R.O. system must be "trained" to respond to that patient's voice commands. Training the H.E.R.O. System 1 involves connecting the nurse station 30 to the computer 10 and then following the on-screen instructions which appear on the video monitor 32 and making the appropriate responses on the keyboard 31. Once training is complete, the created template containing all the patient's voice command information is saved to a floppy diskette 19 and the nurse station 30 is disconnected. As the nurse station 30 is only needed during the patient training period, one nurse station can be used to service a large number of H.E.R.O. system-equipped hospital beds, such as an entire hospital ward or floor of H.E.R.O. system-equipped beds.

Figure 8A:
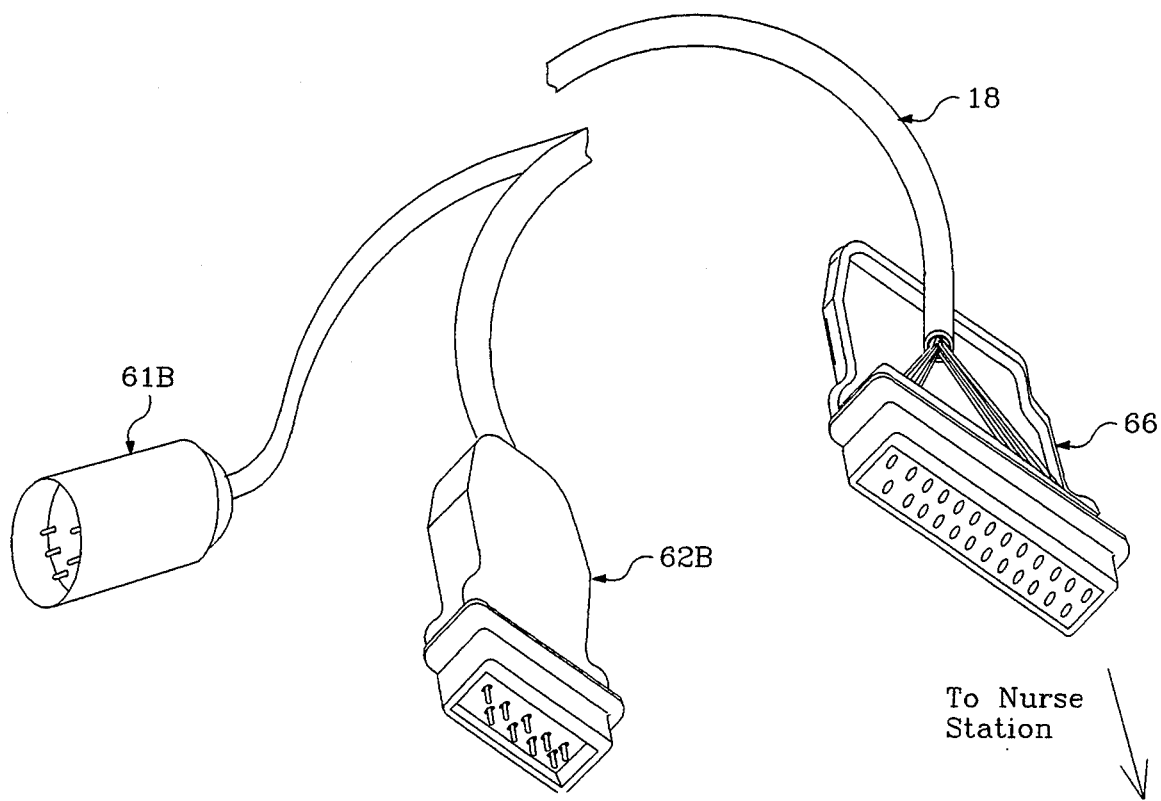
FIG. 8A is an enlarged fragmentary perspective view of the nurse station cable interface.
Figure 8B:
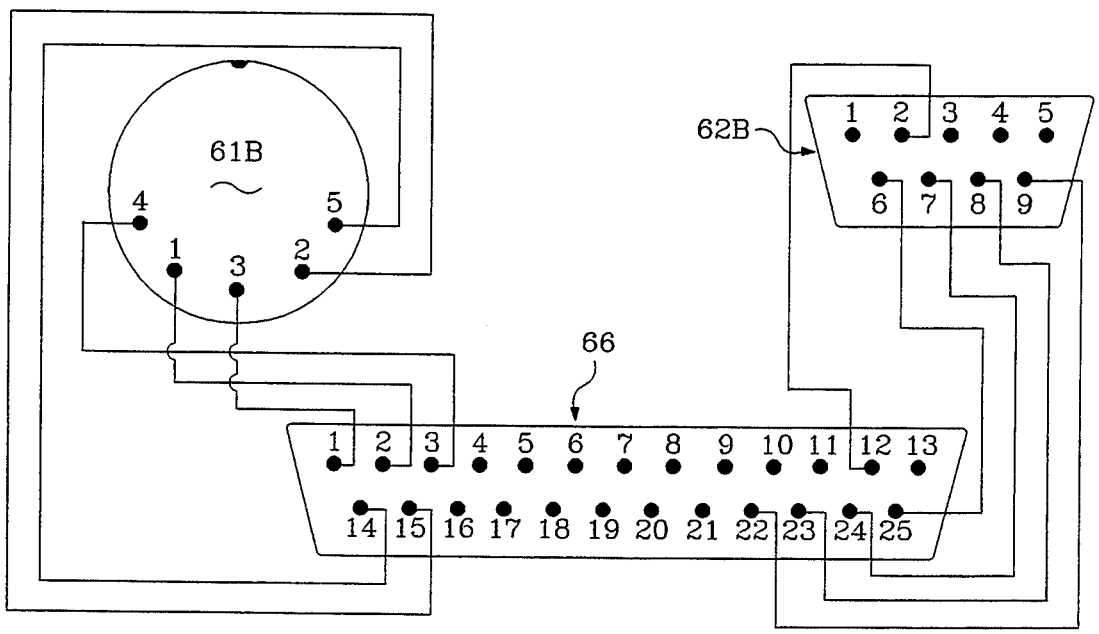
FIG. 8B is the wiring schematic for the nurse station cable interface of FIG. 8A.

As a convenience, the nurse station 30 is preferably contained within a wheeled dolly (not shown) for portability. As is also seen in FIGS. 8A–8B, the keyboard and video cable connectors may be joined to form a single nurse station cable 18 having a single DB25 connector for simple one plug connection of the nurse station 30 to the computer 10. For this cabling arrangement, the nurse station 30 would also have a corresponding two-into-one cable arrangement having a mating DB25 connector (not shown).

Figure 2:
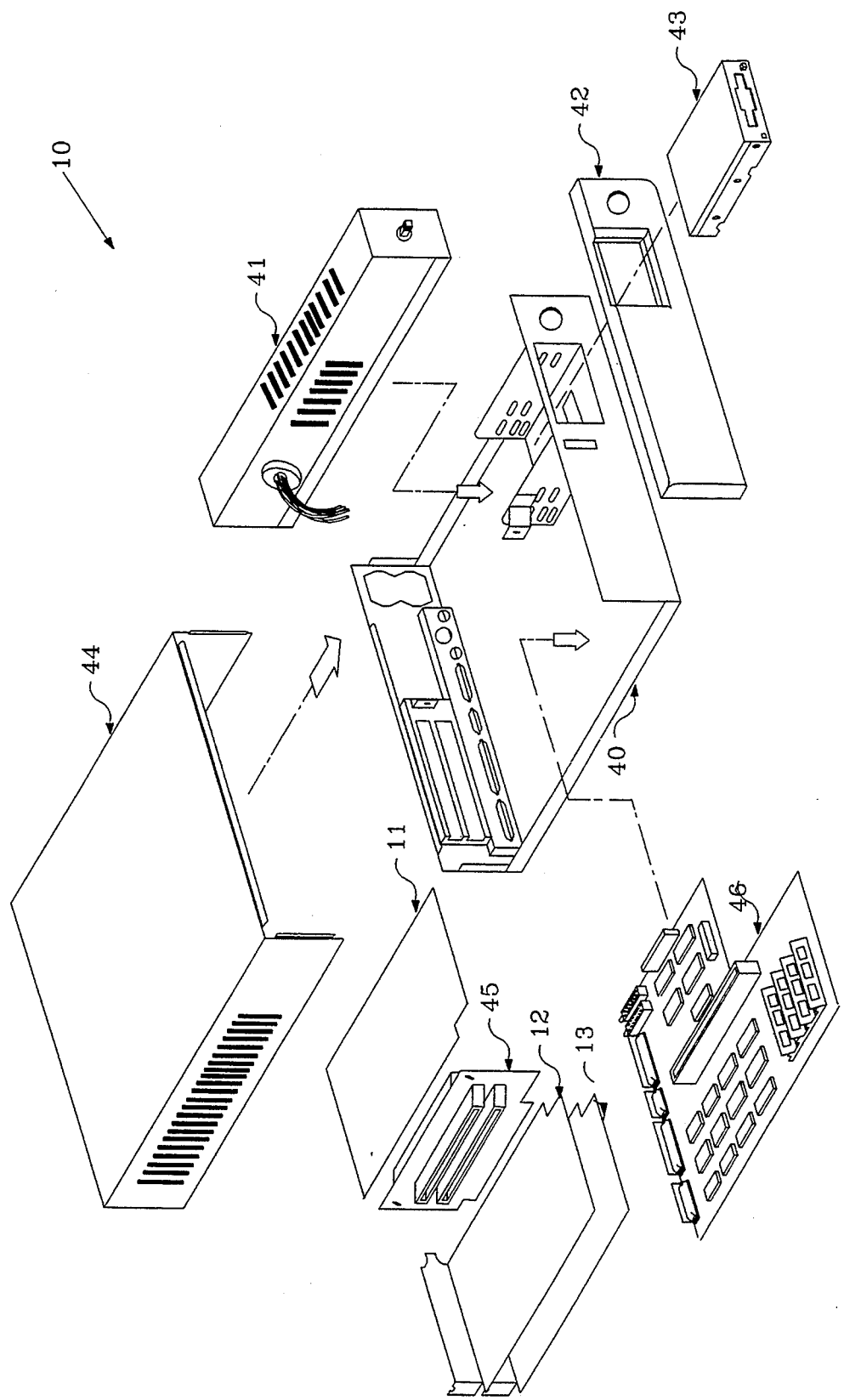
FIG. 2 is an exploded front perspective view of the modified personal computer of FIG. 1 constructed in accordance with one embodiment of the present invention.
Figure 3:
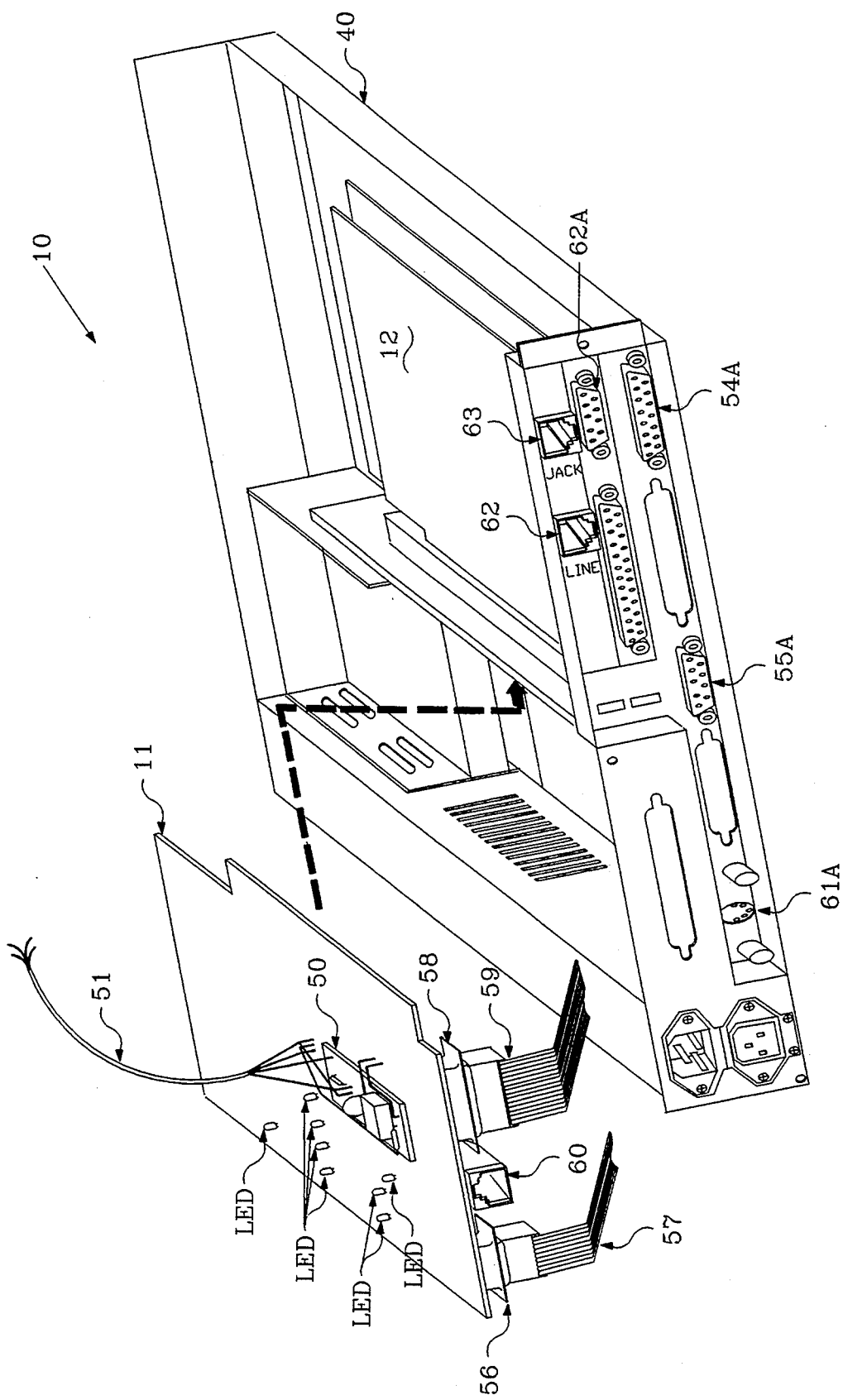
FIG. 3 is a back side perspective view of the modified personal computer similar to FIG. 2 showing the controller card (containing the audio gain amplifier) exploded therefrom.

FIGS. 2 and 3 show in exploded perspective, the detail of the computer 10. The computer 10 is preferably any commercially available IBM or IBM compatible XT (8088), AT (80286), AT enhanced (80386) or like personal computer. The computer 10 broadly comprises a chassis 40 having a power supply 41 mounted thereon, a front panel 42 and a cover 44. A 3.5" floppy disk drive 43 runs the voice recognition and H.E.R.O. operating software associated with the present invention. While any type of drive system may be used in the computer, the standard 3.5" floppy disk drive 43 is preferred as it is adequate for the task at hand, inexpensive, readily available, and permits an individual patient's voice training to be transferred by floppy diskette 19 to another bed without the need for reconnection of the nurse station 30 for additional voice training.

The internal electronic components of the computer 10 include a conventional motherboard 46, the controller card 11, the voice card 12, and the graphics/video card 13. The controller card 11, voice card 12 and graphics/video card 13 are connected to the computer's system bus by a three bus extender card 45. The above-mentioned controller card, voice card, and graphics/video card are connected to the computer through bus connectors.

As is best seen in FIG. 3, the modifications to the internal components of the computer 10 will now be described. A principal modification is the desoddering off of the hard wire connections between the motherboard and the standard DB9 and DB15 serial ports, 55a and 54a, respectively. Instead, the DB9 serial port 55a is connected to the controller card 11 at connector 56 by ribbon cable 57 and the DB15 female connector 54a is connected to the controller card 11 at connector 58 by ribbon cable 59.

The controller card 11 includes eight (8) LEDs, LED's 1–8, and a telephone amplifier or audio gain assembly 50 attached to its top surface. The telephone amplifier assembly is used to transmit and receive boosted telephone signals from the headset microphone 26 to the voice card 12 so that the other person on the line hears the patient's voice clearly as if he were using a conventional phone. A telephone interface connector 60 (a standard RJ11 connector) is attached to the underside of the controller card 11 and connected to the ¼ phone jack 62 on the back of the computer by a standard phone line (not shown).

Each LED 1–8 is connected to a particular contact RELAY 1–8 of the controller card 11, wherein each contact RELAY is dedicated to a specific hospital bed or room environment function. For the example provided Hill-Rom hospital bed, the first seven contact RELAYS are used for the following bed functions: "head up"; "head down"; "legs up"; "legs down"; "TV on/off and channel select"; "bed light on/off"; and "nurse call". The 8th contact RELAY is included for the telephone receive function and is enabled during dialing out and phone call reception operations and acts to boost the reception signal of the telephone interface. Any number of additional RELAYs may be added (and provided on a separate controller card, if necessary) for the contact switch operation of additional entertainment functions or other appliances.

As in standard practice, illumination of a particular LED indicates that the contact RELAY associated therewith is operational. The individual LEDs may be appropriately marked as a diagnostic/troubleshooting aid for the hospital technician or biomedical engineer during service or repair of the system.

As is seen in FIG. 3, the back face of the computer 10 also includes the standard connectors for peripheral equipment, including the 5 pin female connector 61a for the keyboard and the DB9 female connector 62a for the video monitor. The two ¼ phone jacks 62 and 63, respectively are associated with the provided voice card 12. Phone jack 63 is wired to the existing J2 connector (not shown) on the voice card 12 in the known manner and is used as the microphone connector. Transmit and receive signal information from the microphone 26 is sent from the telephone amplifier 50 through line 51 to the coordinate transmit and receive terminals of the microphone connector 63 in the known way.

Figure 4A:
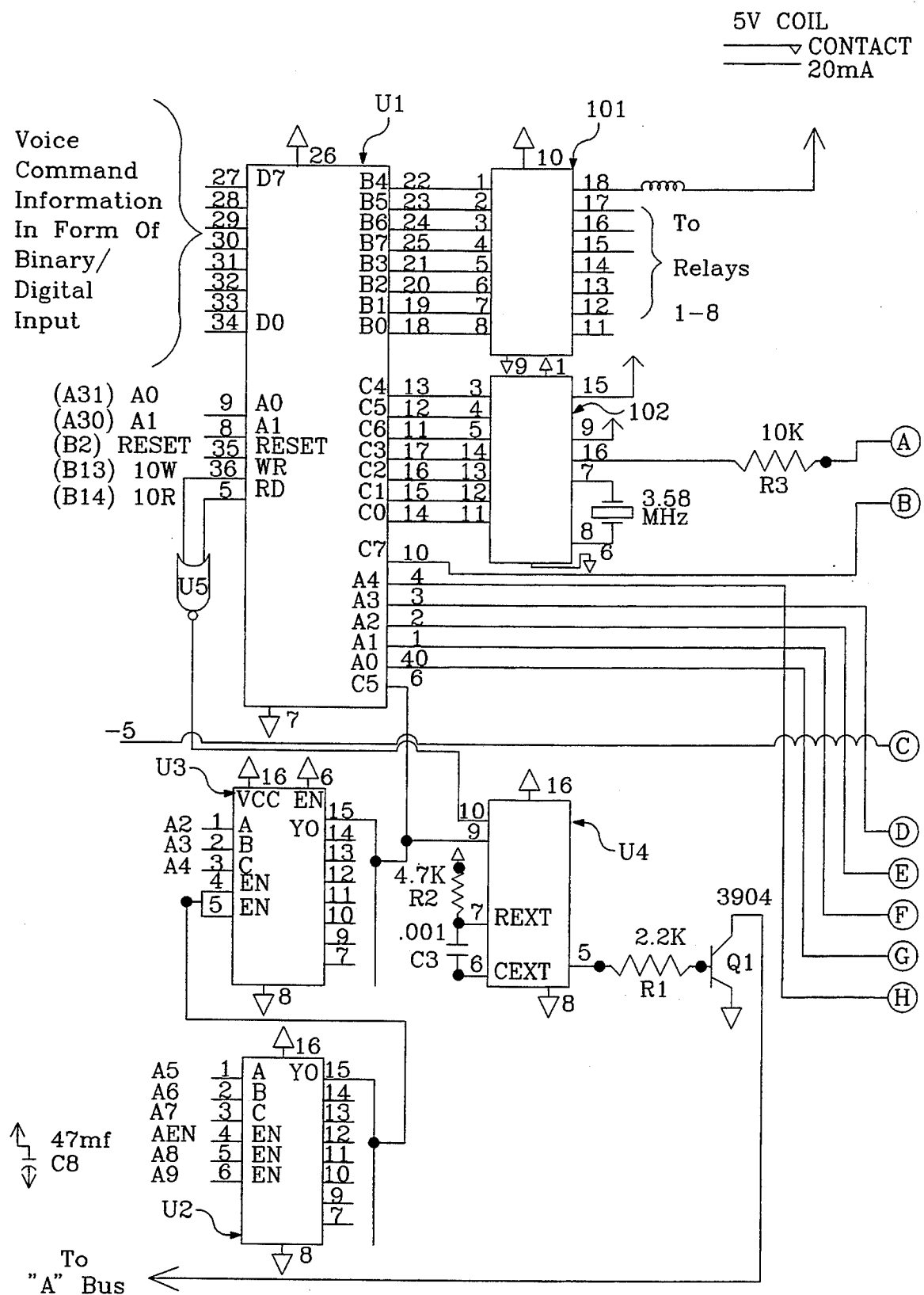
FIGS. 4A and 4B are a plan view showing the component detail for the controller card.
Figure 4B:
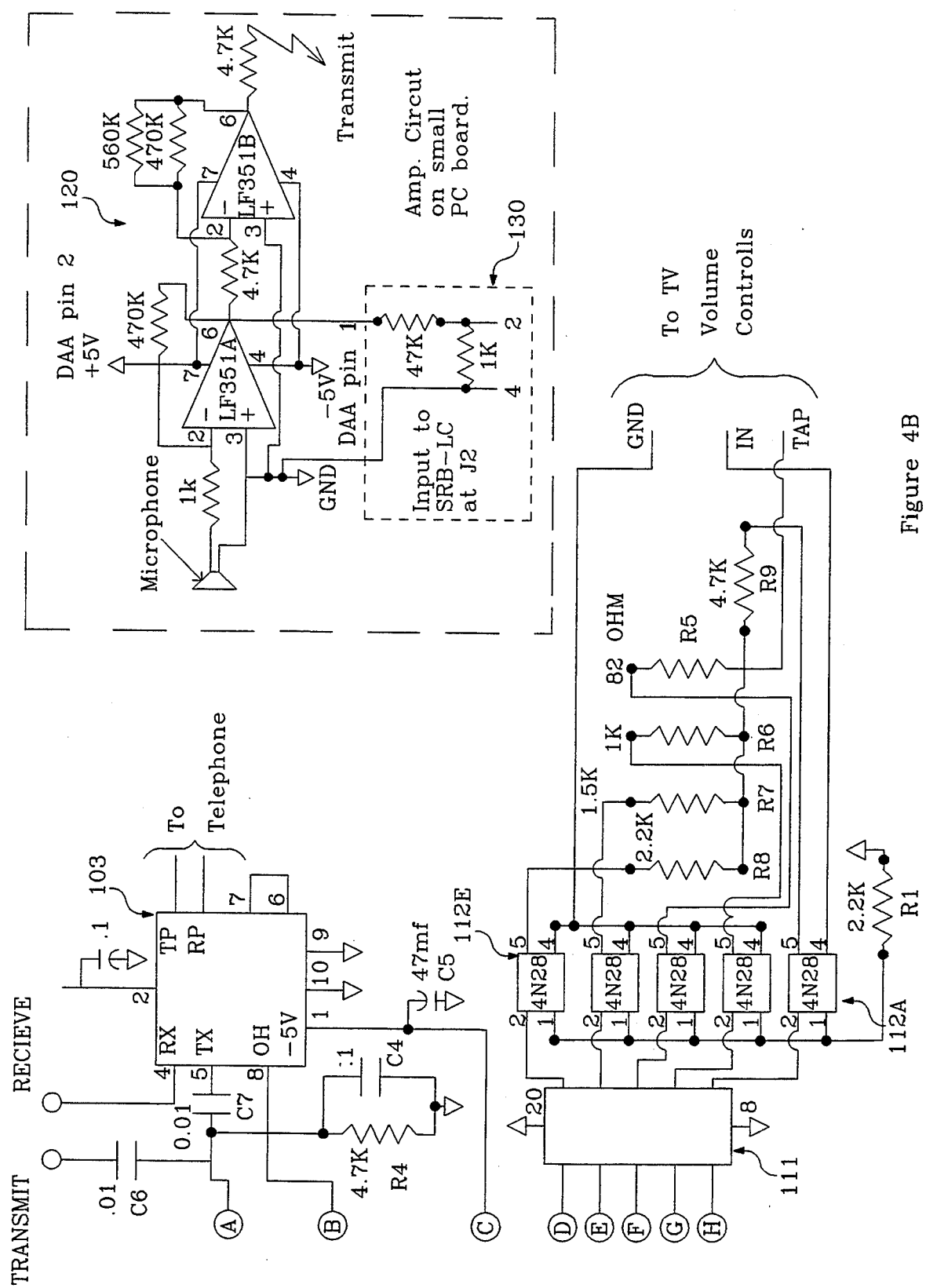
Figure 4C:
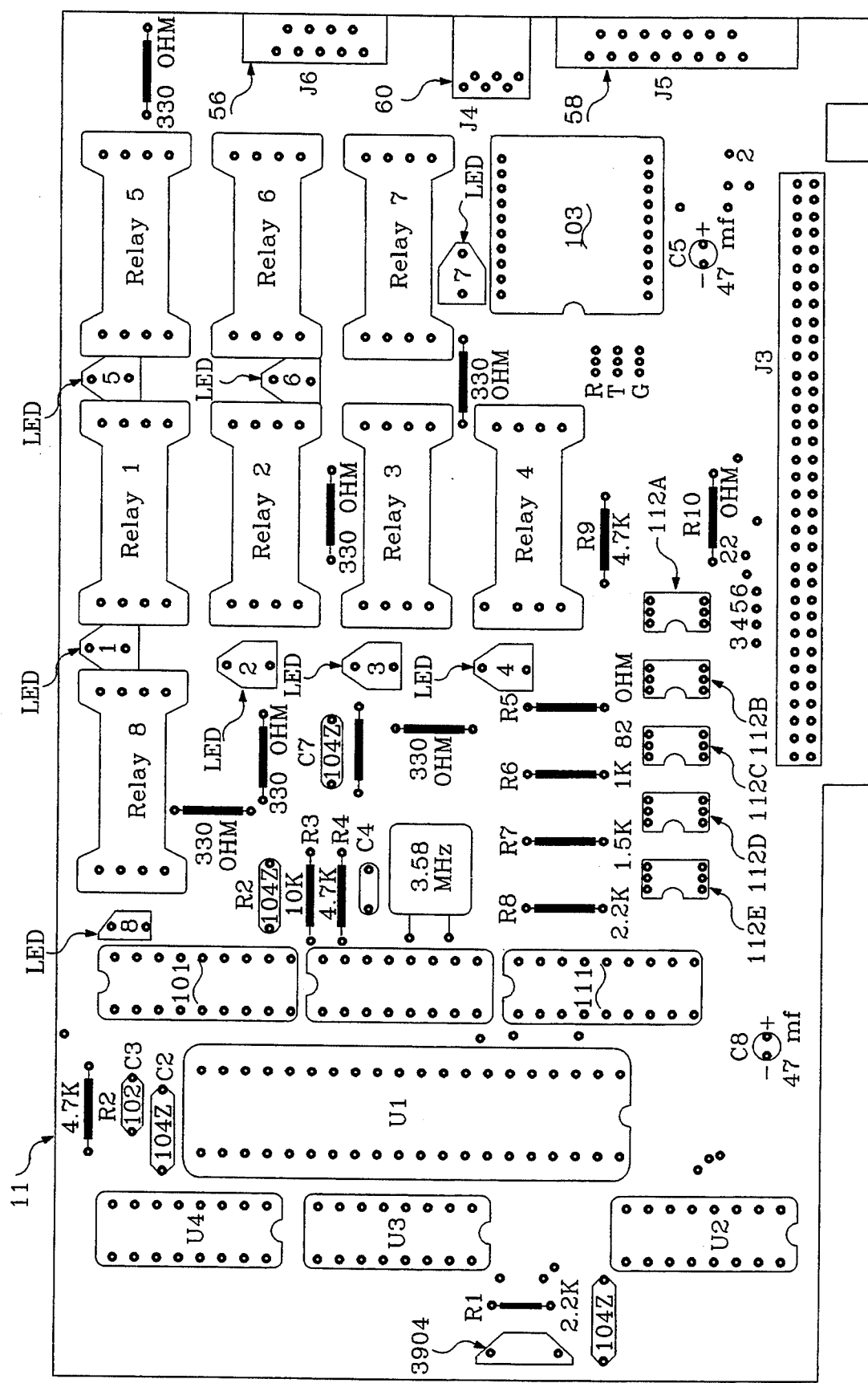
FIGS. 4C and 4D are a schematic circuit diagram for the controller card.
Figure 4D:
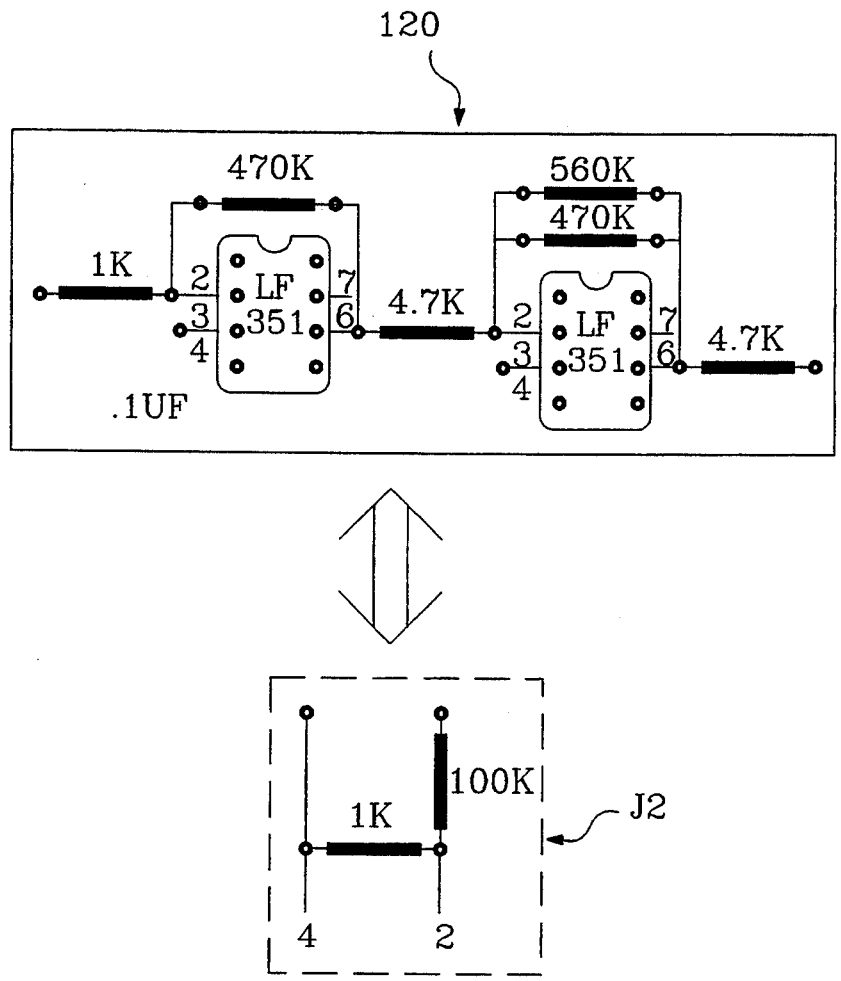

Referring to FIGS. 4A and 4B, the detail of the controller card 11 will now be described. The controller card 11 of the present invention is essentially a composite of three known cards available through ALPA PRODUCTS of Fairfield, Conn., including the AR133 "A bus" adapter card, which is used for interfacing through the system's address bus; the RE140 or RE156 Reed Relay card (which is used to signal the appropriate RELAY contacts for operating the provided hospital bed and room functions), and a TE158 "A bus" telephone controller card which enables the phone for dialing out and receiving capability.

The individual semiconductor chips and associated circuits which comprise the controller card 11 are all readily available and their function and utility are well understood and appreciated by those of average skill in the art. The following description illustrates the flow of information through the controller card 11 in response to voice command information received form the voice card 12 and operating instructions received from the mother board.

Binary/digital data input corresponding to a particular voice command is received as input by the peripheral interface adapter U1 (Intel M5L8255AP-5) at inputs D0–D7. The peripheral interface adapter U1 is powered at pins 7 and 26 and connected to the A bus at $A_0$ (pin 9) and $A_1$ (pin 8) and is reset at pin 35. When the data input involves one of the hospital bed functions, the relay control switch for the eight RELAYS 1–8 becomes activated.

For the situation where the patient is desiring to operate a bed motor function, such as for example, where the patient wishes to raise the head position on the hospital bed, the patient gives the appropriate command into the microphone 26. This information is sent as output from the peripheral interface adapter U1 at outputs B0–B7 to the input of the relay control switch 101 (Sprague 2803) at lines 1–8, which in turn, activates the appropriate one of the RELAYs 1–8 which has been assigned to the "head up" function. In the present example, RELAY 3 has been assigned to the "head up" function. Of the eight RELAYs, RELAYs 3–6 are reserved for four motorized bed movements of "head up", "head down", "legs up", and "legs down".

The contact for the "head up" relay remains closed (ie, the head portion of the bed continues to rise) until a second command (e.g., "stop") is received. This second command re-opens the contact to RELAY 3 thus stopping the upward movement of the head portion of the bed at that instant. In some applications, it may be desirable to put a limit on the time length or motion range for each bed motor operation. For example, for some health conditions, a head up bed motion may induce unconsciousness in the patient. Therefore, a duration constraint, such as, for example, a time limit from 1–9 seconds may be designed into the software in a known manner to control the length of time for actuation of the head up bed motion.

RELAYs 4–6, which are assigned to the other motorized bed functions (ie, "head down", "legs up", "legs down") operate in the same way. As discussed briefly above in connection with FIG. 3 and as is seen in FIGS. 3 and 4A, each RELAY has an associated light emitting diode (LED) which is illuminated upon the closing of the contact for that RELAY, thus indicating that that RELAY is being activated.

RELAYs 1, 2 and 7 are assigned to the bed light on/off function, the nurse call function, and the TV on/off and channel select functions, respectively. These RELAYS operate by a quick pulse contact method such that when the patient gives the appropriate command for one of these RELAYs (eg, the command "hero, light on!" for bed light function corresponding to RELAY 2) it pulses the contact closed for that RELAY for 1–2 seconds. This pulse length is sufficient to insure that a "switch activate" signal is received by the appropriate switch of the control consul of the provided hospital bed to complete the desired function (i.e., turn the light on). A second command, e.g., "hero, light off!" pulses the contact closed for 1–2 seconds which sends a signal to deactivate the last sent function signal, i.e., in the instant case it would turn off the light. The operation for RELAY 1 corresponding to the nurse call, operates in a similar manner as the above described operation for the RELAY 2, light on/off function.

RELAY 7 which corresponds to the TV on/off and the next channel select function also operates in a quick pulse contact manner but differs slightly in that after the TV has been turned on, the continued quick-pulse signals change the channels of the TV sequentially until the last channel is reached. A final quick-pulse signal of RELAY 7 then turns the TV off. In FIG. 4B, J6 represents the 9 pin connector (element 56 of FIG. 3) through which signal information on the bed motor controls associated with RELAYS 3–6 is passed. J4 is preferably a standard connection for the RJ11 telephone connector (element 60 of FIG. 3). J5 represents the 15 pin connector (element 58 of FIG. 3) for the DB15 cable through which signal information for the light on-off, nurse call, TV on/off, channel select and volume control associated with RELAYs 1, 2 and 7 is passed.

For the situation where the patient desires to adjust the TV volume, the appropriate voice command is issued by the patient into the headset microphone 26 and this signal information is ultimately sent via outputs A0–A4 of the peripheral adapter device U1 to a TV volume control circuit generally designated as 110 in FIG. 4A. The TV volume circuit 110 includes an octal bus transceiver 111 (Texas Instruments SN74LS245) five isolators 112a–e (General Electric 4N28's) and a resistor network, $R_1$ and $R_{5-9}$. The transceiver 111 takes boosted signal information to switch the five isolators 112a–e on or off in accordance with the volume level desired. The volume control circuit 110 forms a volume control which is isolated from the computer operating system.

Each isolator 112a–e receives switch information from the transceiver 111 at input 2 and TV volume signal information at input 4. When a particular isolator is switched on, it sends TV volume signal information at its output 4. Isolator 112a represents the TV volume on/off. Isolators 112b–e represent increasing levels of signal boost (ie, increasing levels of TV volume).

For the situation where the patient wishes to dial out or receive a call on the phone, the phone is taken off hook by a signal sent from the peripheral interface adapter U1 at C7 to pin 6 of telephone interface chip 103 (XECOM XE0002) and voice command dialing information is sent from outputs C0–C6 of the peripheral interface adapter U1 to the inputs 3–5 and 11–14 of touch tone generator 102 (Texas Instruments 5089). Simultaneously, RELAY 8 is activated, which provides an increased volume (or power) to the receiver in the headset microphone earpiece. The touch tone generator 102 also interfaces with the transmit pin 5 of telephone interface chip 103 for transmitting a dialed number sequence across the $C_6$ capacitor. While, in the preferred implementation, an XE0002 chip is selected as the telephone interface chip 103, it is understood that any known FCC approved data access arrangement may be used to perform the desired functions of dialing out and receiving incoming calls.

Information concerning dialing transmission is sent from the touch tone generator 102 at line 16 across resistor R3 where it is received at pin 5 (transmit pin) of the telephone interface chip 103. Signal information to take the phone off the hook is sent from C7 of the peripheral interface adapter U1 to pin 8 (OH) of the telephone interface chip 103. Signal information for incoming calls is received at pin 4 of the telephone interface chip 103. The telephone interface chip 103 includes the conventional telephone connections indicated by the conventional symbols at TP (tip prime) and TR (tip ring).

A simple arrangement for boosting microphone signal input to the voice card 12 is also illustrated by the microphone amplifier circuit 120 in FIG. 4A. The microphone amplifier circuit comprises two LF 351 amplifiers (National Semiconductor Corp.) connected in series and generally designated LF 351A and LF 351B. The dual-amplifier circuit receives audio signals from the microphone, boosts them, and then transmits the boosted signals to the voice card, which, in turn, sends the boosted signal information on to the telephone circuit or uses it internally. The second amplifier LF 351B is added to boost the DTMF (Dial Tone Modulated Frequency) dial tone signal originating from the dial tone generator 102 at pin 16.

Pin 4 and pin 7 of the first LF 351A amplifier connect to telephone interface chip 103 at pin 1 and pin 2, respectively. Pin 4 and pin 7 of LF 351A also connect to pins 4 and 7 of the second LF 351B, respectively. Also, pin 3 (gnd) of LF 351A connects to pin 3 (gnd) of LF 351B. Pin 6 of LF 351A is connected to pin 2 of LF 351B and the output of the amplifier circuit is at pin 6 of LF 351B which is connected to the transmit pin (pin 5) of the telephone interface chip 103 (XE0002). In all other respects, the LF 351A is mirrored by the LF 351B with the exception of the additional serially connected 560K resistor disposed between pin 2 and pin 6 of the LF 351B. Positive input (pin 3) and audio gain output (pin 6) from the LF 351A complete the connection to the J2 (microphone) connector at pins 4 and 2, respectively.

A resistor network such as the one generally indicated at 130 may be provided to the voice card's circuitry to reduce the amplitude of the audio gain input to the voice card 12. The valves for the resister network 130 shown are intended for use with the aforementioned SLB-RC voice card.

The controller card 11 also includes a known circuit arrangement for an address decoder which generally comprises the known elements designated as elements U2, U3, U4, and U5, wherein U4 is a monostable multivibrator (Texas Instruments SN74LS123) which is responsive to read (RD) and write (WR) input received from the peripheral interface adapter U1 at pins 5 and 36 through the NAND gate U5 and is also responsive to input received from the two 3-line to 8-line decoders U2 and U3 (Texas Instruments SN74LS138) wherein they each take three lines of input to select one of eight lines as output depending in the status of the lines. This circuit's function is to give the controller card 11 a specific logical address in the computer at all times. In this regard, the three lines of input are received at $A_2$–$A_4$ (pins 1–3) of U3 and $A_5$–$A_7$ (pins 1–3) of the $U_2$ and pines 4–6 of both $U_2$ and $U_3$ are for encoding the address input. Desired valves for the associated circuit elements are as indicated in FIGS. 4A–4B.

Figure 5A:
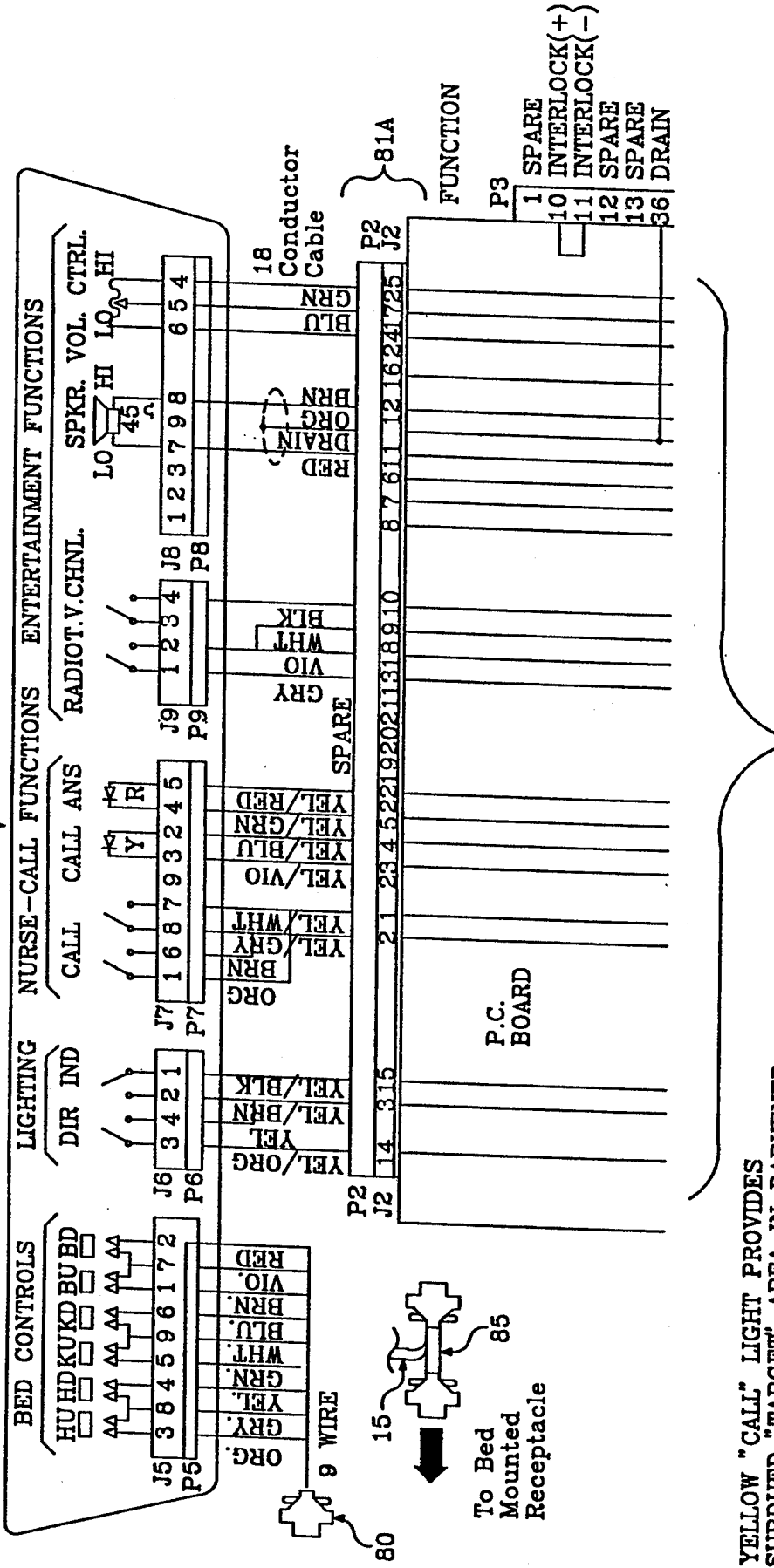
FIGS. 5A, 5B and 5C are a schematic circuit diagram of an example prior art electrically operated, low voltage, multi-function, hospital bed which is shown to illustrate the physical cabling connections to the personnel computer.
Figure 5B:
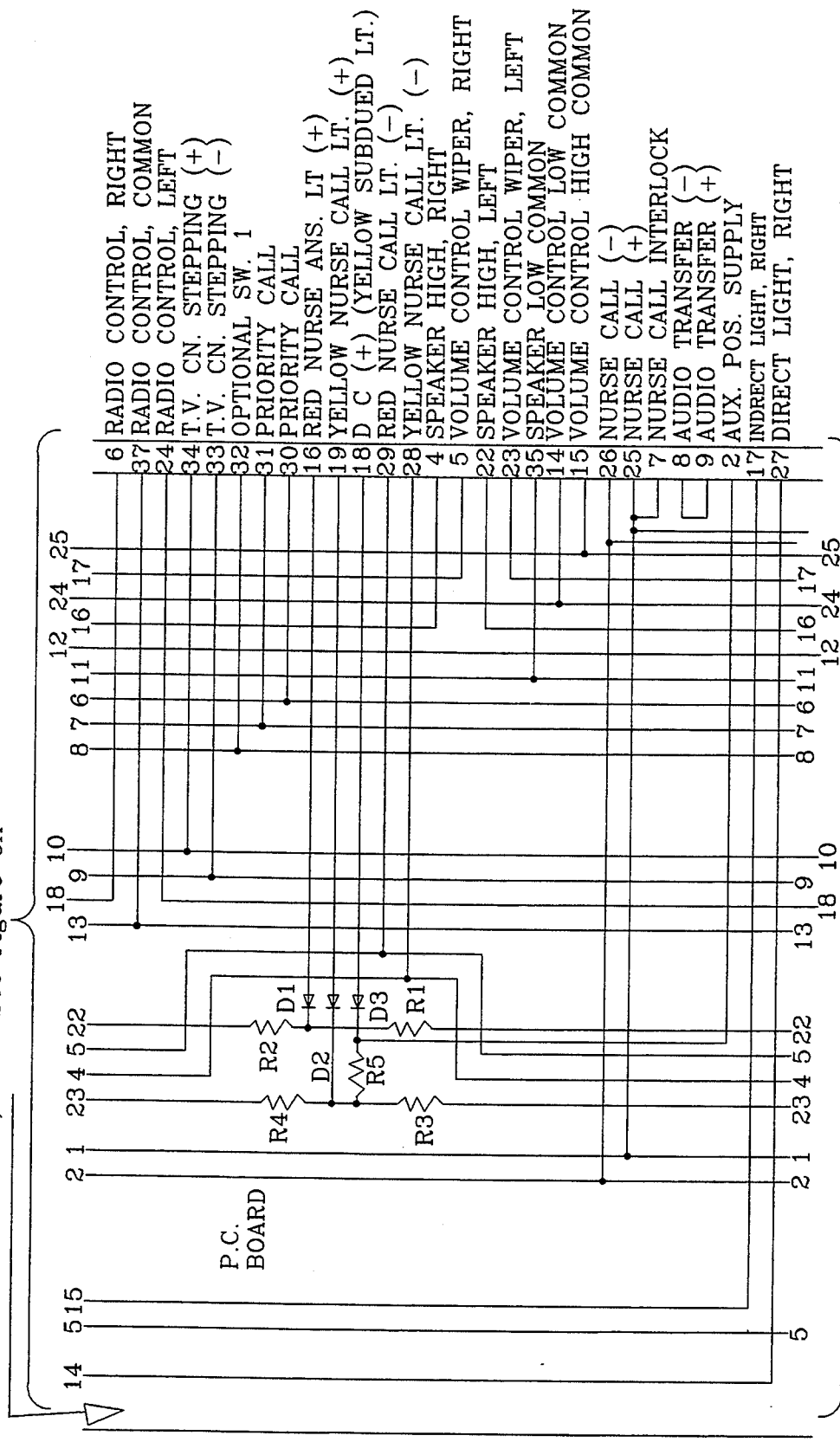
Figure 5C:
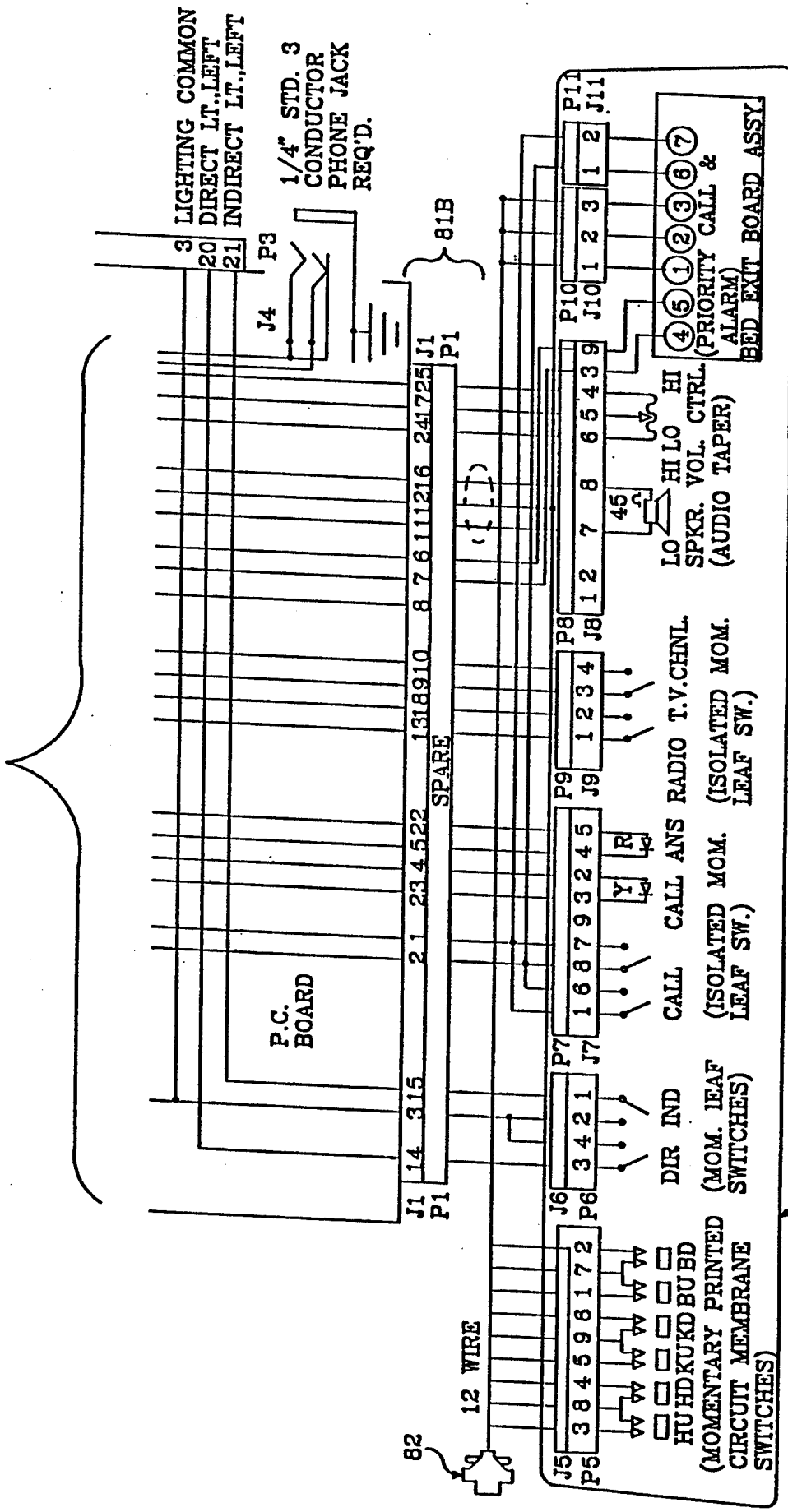

FIG. 5 shows the control unit wiring schematic for the example SIDECOM hospital bed by Hill-Rom (product No. 850,852). The schematic shows a PC board 79 which is hard wire connected to right and left side guards 77 and 78, wherein each side guard contains the electrical switch connections for the bed controls, lighting, nurse-call and entertainment functions. The hard wire connection between the PC board 79 and the side guards 77, 78 is by standard DB25 connectors, generally designated as 81a, 81b in FIG. 5. The schematic also shows DB9 connector 80 and a DB12 connector 82 directed from the right and left sideguards, 77 and 78, respectively for insertion into corresponding 9 and 12 pin bed mounted receptacles.

Referring now to FIGS. 1, 5 and 6A–6B, the DB9 bed interface cable connector 15 which is connected via serial port 62 and ribbon cable 57 to the controller card 11 is interfaced with the bed electronics by a pass-through molex connector assembly 85. Molex connector assembly 85 has 15 pins and therefore may be connected to either the 9 pin connector 80 or the 12 pin connector 82 of the bed. The molex connector assembly 85 preferably includes a readily available 15 pin molex receptacle 86 and corresponding molex plug 87 so that it permits the unobstructed pass through of patient voice command information (ie, bed controls, lighting, nurse call, etc.). In this way, the connection of the H.E.R.O. system 1 to the hospital bed does not override or interfere with the bed's conventional mode of push-button command operation. The cable 15 also includes a DB9 plug connector end 55b which plugs into the DB9 serial port 55a located at the back of the computer 10.

Figure 6B:
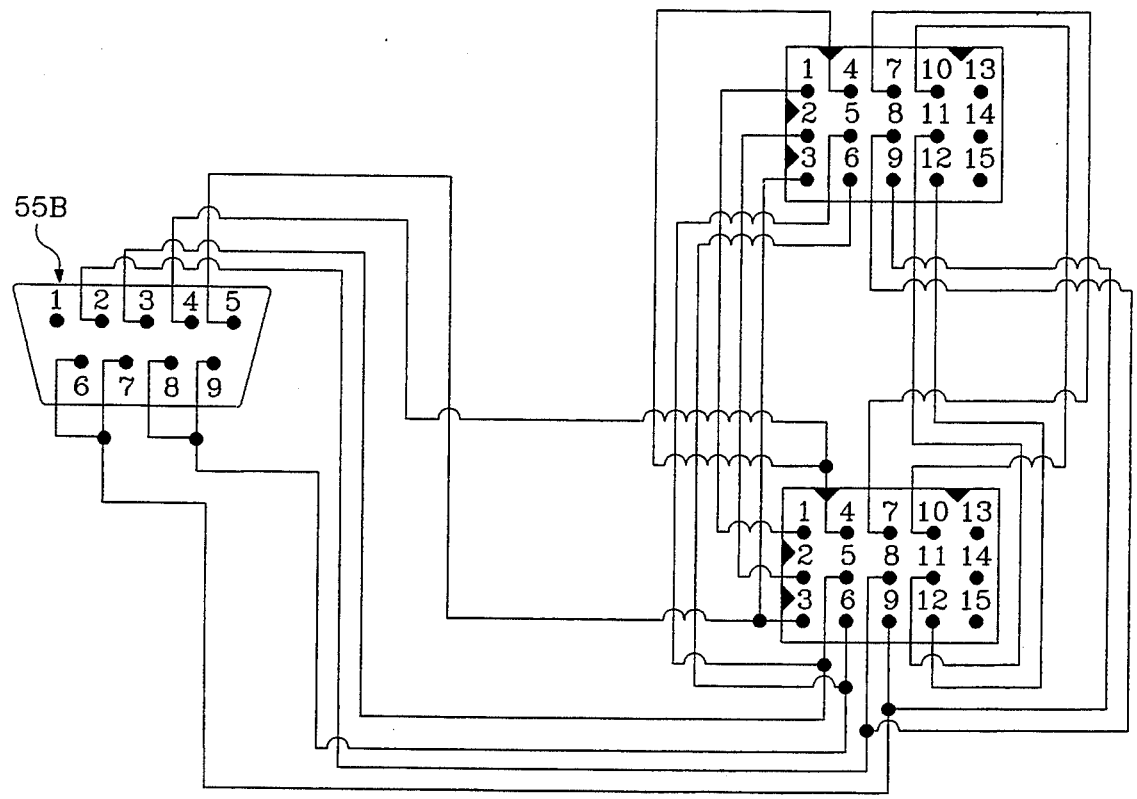
FIG. 6B is a schematic diagram showing the wiring for the first hospital bed interface cable of FIG. 6A.

As is best seen in the wiring schematic for the bed interface cable 15 of FIG. 6B, only information relating to four bed functions ("head up", "head down", "leg up", "leg down") are carried on this cable. Pin 3 of the DB9 cable is connected in parallel to pin 9 of the corresponding bed motor receptacle (80 or 82) and is a ground for the "leg up" and "leg down" functions. (Note, the Hill-Rom schematic uses the abbreviations "KU" and "KD" for "knee up" and "knee down" in the designation for pins 5,6 and 9 which is the same as the "leg up" and "leg down" designations used in this description). Pin 4 of the DB9 cable is connected in parallel to pin 4 of the bed motor control and relays a "head down" signal. Pin 5 of the DB9 cable is connected in parallel to pin 3 of the bed motor control and relays a "head up" signal. Pin 7 of the DB9 cable is connected in parallel to pin 6 of the bed motor control and is a ground for the "head up" and "head down" functions. Pin 8 of the DB9 cable is connected in parallel to pin 5 of the bed motor control and relays a "leg up" signal. Pin 9 of the DB9 cable is connected in parallel to pin 6 of the bed motor control and relays a "leg down" signal. Pins 1 and 2 of the bed motor control corresponding to the "bed up" and "bed down" functions and pins 10–12 of the bed motor control corresponding to the priority call and alarm capability are left alone.

Figure 7A:
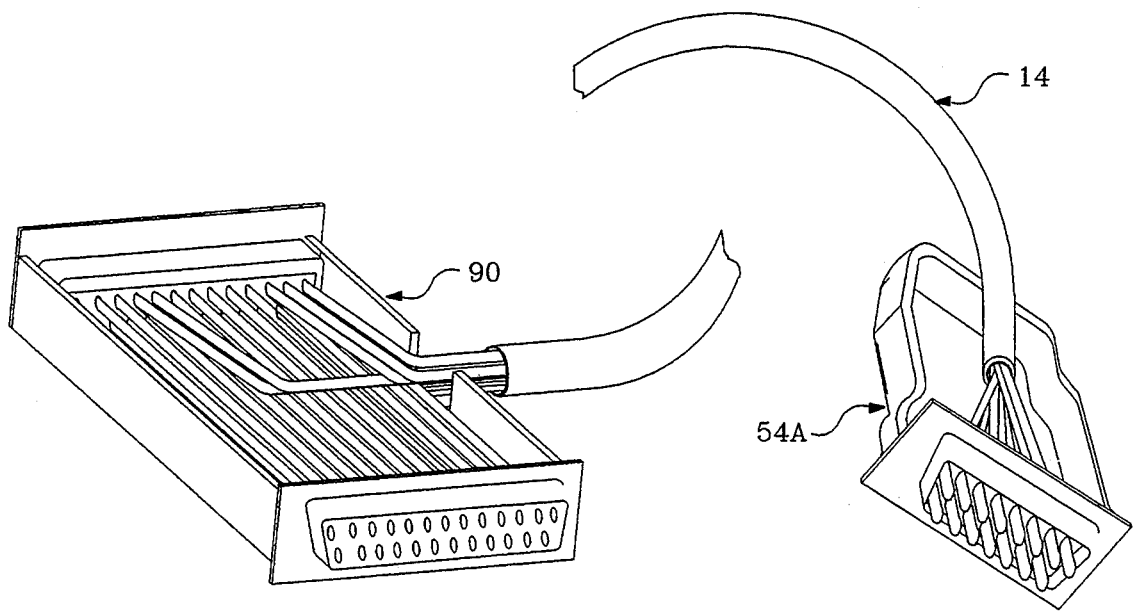
FIG. 7A is an enlarged fragmentary perspective view of a second hospital bed interface cable which connects the DB15 or 15 pin plug connector (serial port) of the personal computer to an existing 25 pin interface unit on the hospital bed wiring circuit for providing voice-activated control of the bed light, nurse call, and TV functions.
Figure 7B:
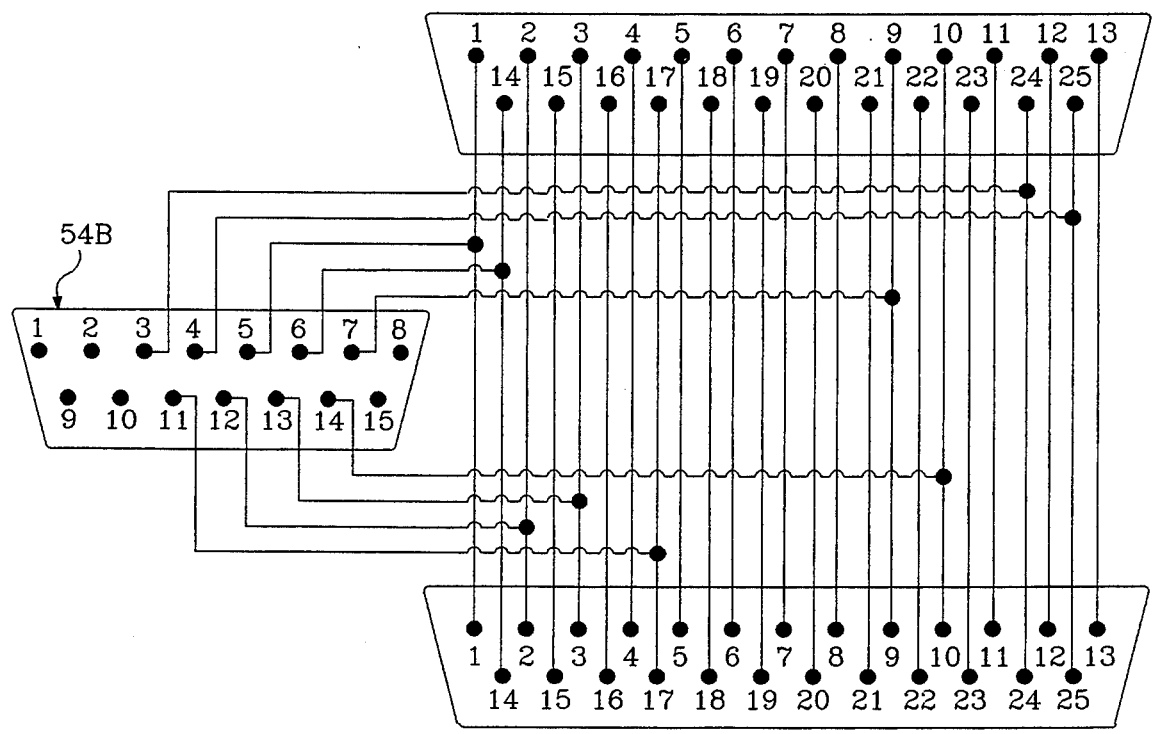
FIG. 7B is the wiring schematic for the DB15 hospital bed interface cable of FIG. 7A.

FIGS. 7A and 7B show the detail of the DB15 cable connector 14 which carries voice command information concerning the functions of "TV on/off and channel select", "bed light on/off" and "nurse call" and any additional entertainment or room functions that may be added as room features. The DB15 cable 14 includes a male connector end 55b which plugs into corresponding DB15 serial port 55b located on the back panel of computer 10 and an interface box 90 consisting of a male and female DB25 connectors for interfacing, in pass-through fashion, with a corresponding existing unit on the provided hospital bed 20. For the example Hill-Rom bed, the interface box 90 is connected to either of the existing DB25 connectors located between the left or right side guards and the PC board. These connection points are designated generally as 81a or 81b in FIG. 5.

With reference to FIGS. 5 and 7B, pins 3 and 4 of the DB15 connector 14 are connected in parallel with pins 24 and 25, respectively of the DB25 bed connector and relay "TV volume" signal information. Pins 5 and 12 of the DB15 connector 14 are connected in parallel with pins 14 and 3, respectively of the DB25 bed connector and relay "bed light on/off" signal information. Pins 6 and 13 of the DB15 connector 14 are connected in parallel with pins 1 and 2, respectively of the DB25 bed connector and relay "nurse call" signal information. Pins 7 and 14 of the DB15 connector 14 are connected in parallel with pins 9 and 10 of the DB25 bed connector and relay "TV on/off" and "channel select" signal information.

FIGS. 8A–8B show one embodiment for a convenient cable arrangement for connecting the portable nurse station 30 (keyboard 31 and video monitor 32 of FIG. 1) to the rest of the H.E.R.O. system 1. In the preferred best mode, the computer 10 is stored out of the way and under the bed 20. As a convenience to the nurse attendant who connects the keyboard 31 and video monitor 32 to the computer to boot up the H.E.R.O. system software and perform the voice training procedure each time a new patient is admitted to a bed, a single split cable 18 is provided which cosines a conventional keyboard connector 61*b* and video monitor connector 62*b* into a single cable 18. This cable (splitter cable) 18 is permanently plugged into the computer 10, at their respective ports 61*a*, 62*a*. The splitter cable 18 preferably is of a length sufficiently long so that its single plug DB25 connector 66 may be mounted to the side of the bed. The nurse then, simply positions the nurse station 30 next to the bed and plugs a mating DB25 connector of a similar splitter cable arrangement for the nurse station 30 (not shown) into the DB25 connector 66. Various extension cable connectors may be incorporated into the nurse station cabling arrangement to permit a wider range of height and extension capability as the need arises. The preferred arrangement for the pin connections of the plug ends 61*b*, 62*b* with the DB25 connector 66 are shown in FIG. 8B.

FIGS. 9A–D set forth a flow diagram for the operational sequence initial set-up and operation of the H.E.R.O. system hardware and implementation of the H.E.R.O. system software. Each time a patient is introduced to a bed, the initial consideration at 200 is whether the patient is new to the H.E.R.O. system or merely a transfer from another bed. For new patients, the next consideration at 202 is whether the patient requires the assistance of the H.E.R.O. system. Generally, patients able to operate the manual push-button bed controls of the provided hospital bed do not require the assistance of the H.E.R.O. system. If H.E.R.O. system assistance is required, then at 204 the nurse wheels in the portable nurse station 30 (comprising the keyboard 31 and video monitor 32) and plugs it into the bed's computer 10 and places the headset microphone 26 on the patient's head, positioning the ear piece in the patient's ear and the microphone by the side of the patient's mouth.

For a previously admitted patient, then at 206 the consideration is whether the previously admitted patient has been trained by the H.E.R.O. system. An affirmative response to this query means that the patient has undergone previous voice training on a bed having a H.E.R.O. system and is transferring to this bed. Accordingly, a floppy diskette 19 containing all the previous voice training information is then inserted into the disk drive of the computer 10 and the nurse then assists the patient with the voice training procedure. When the patient has not been trained, then at 208 the nurse enters an "N" (or any preassigned key) on the keyboard in response to a <New Patient?> inquiry on the video monitor 32. This will generate at 210 a short beep or tone which the patient should hear through the headset microphone. This sound check signifies to the patient that the H.E.R.O. system is activated and is responsive to voice input. If the tone is faint or is not heard, the volume is adjusted accordingly at 212. This is done on the keyboard by the nurse in response to instructions on the screen display.

At 214 the nurse presses the space bar to begin the voice training procedure, generally designated at 216, wherein the patient repeats each "room" or "bed" command 7 times or as otherwise specified, in accordance with the voice systems software used with the present invention. Once the initial voice training procedure is complete, the system automatically stores the patient data on the diskette 19 to save the training at 220. The nurse station 30 (keyboard/video monitor unit) is then disconnected and wheeled away to the next location at 222. The H.E.R.O. system is now active and remains in a wait state at 230 until awakened by a patient voice command. Since all the patient's voice training information is stored on diskette 19, nothing is lost, even if the bed 20 (and computer 10) is unplugged and the patient is wheeled to another bed location. The nurse simply plugs the H.E.R.O. system (bed and computer) back into the wall and there is no need to repeat the voice recognition procedures.

Figure 9A:
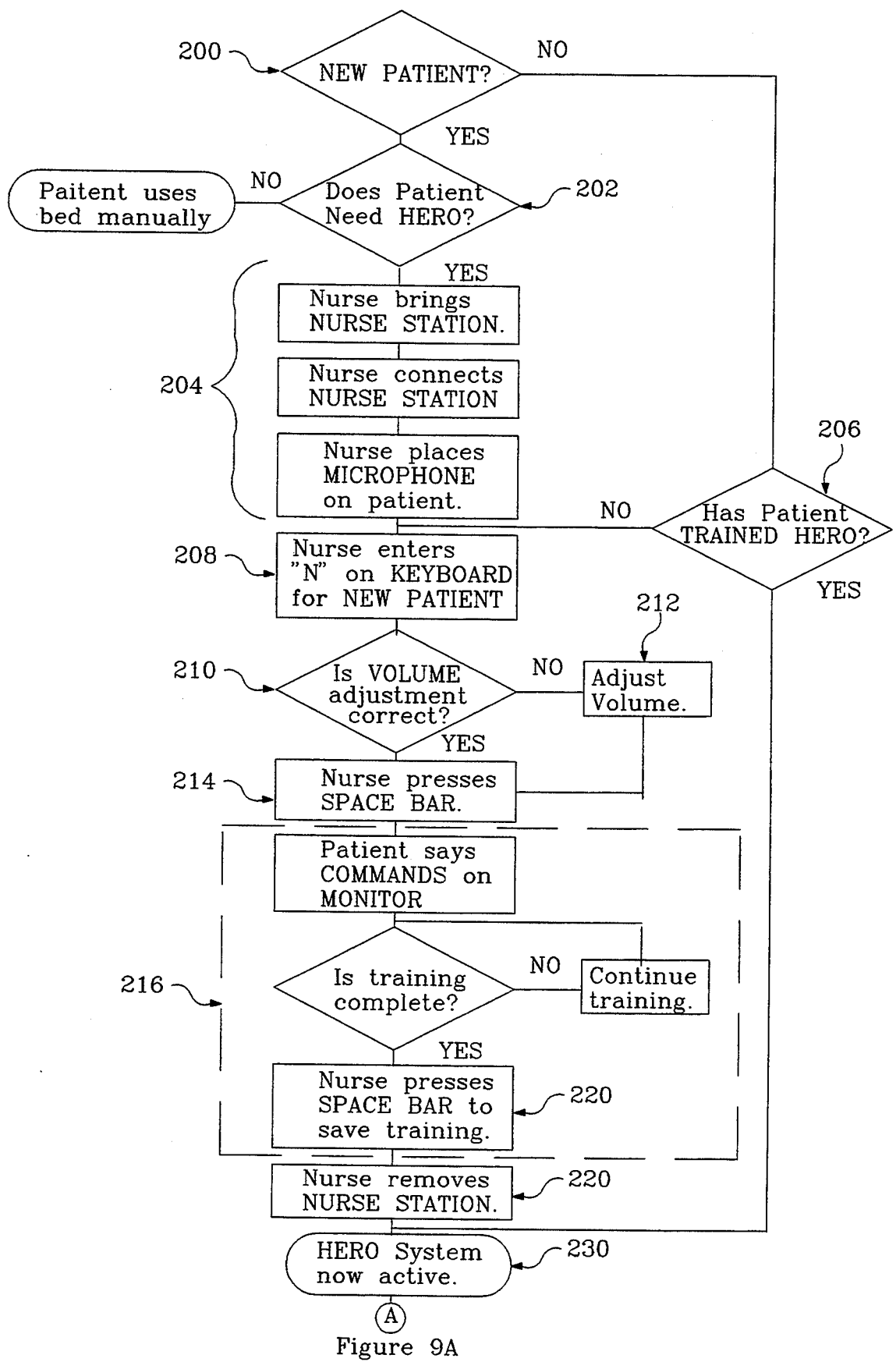
FIGS. 9A–9D are a series of flow diagrams of the overall operation and methodology of the "new patient" initiation procedure and illustrates the voice recognition procedure associated with the various patient commands executed by the system.
Figure 9B:
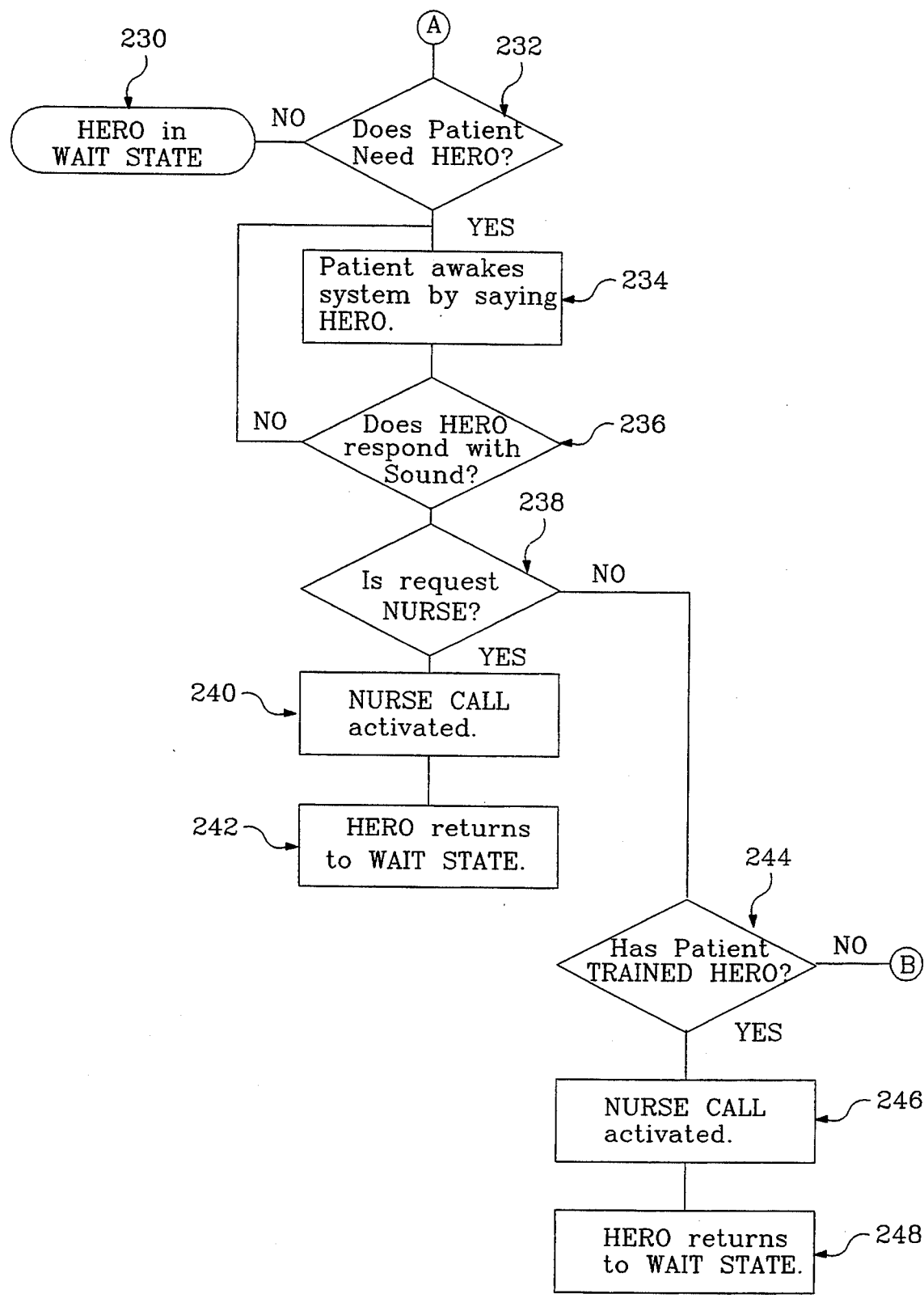

As is seen in FIG. 9B, if a patient decides that he or she needs H.E.R.O. at 232, the system is awakened from wait state 230 at 234 by giving the appropriate wake up command to the H.E.R.O. system. For our example, the system may be awakened by speaking the word "hero" into the headset microphone 26. The system at 236 will signal its response to the headset earphones with a sound, such as the beep tone or other response indicator adjusted at step 212. The patient then gives the command for the function he or she wishes to activate. When the patient wishes to call the nurse, such as at 238, a command "hero nurse" is given at 240 after which the H.E.R.O. system returns to its wait state 242 and awaits further commands. In the preferred embodiment, the H.E.R.O. system software is written so that all commands are prefaced by the word "hero" to activate the system so that it can accept further voice command information from the patient. A single short word, such as "hero" is preferred, since it is easy for the patient to say and is also easily recognizable by the H.E.R.O. system.

The operation of the other H.E.R.O. system room functions follow a similar methodology as the above-described sequence for the nurse call. For example, at 244, if a light function request is desired, (e.g., patient utters a command "hero light on" or "hero light off"), the light is turned on or off at 246, depending the last operational state of the light. The H.E.R.O. system then returns to its wait state at 248. Discussed above with reference to FIGS. 4A–4B, the RELAY switches, RELAYs 1, 2 and 7, for the control of the bed light, nurse call, TV on, and next channel are of a single short pulse variety, such that one command pulses the appropriate RELAY contact closed for a brief instant to turn the function to its desired state, i.e., either on or off, or, in the case of the TV, "TV on", "next channel", "next channel", "next channel", ... etc., "TV off".

Figure 9C:
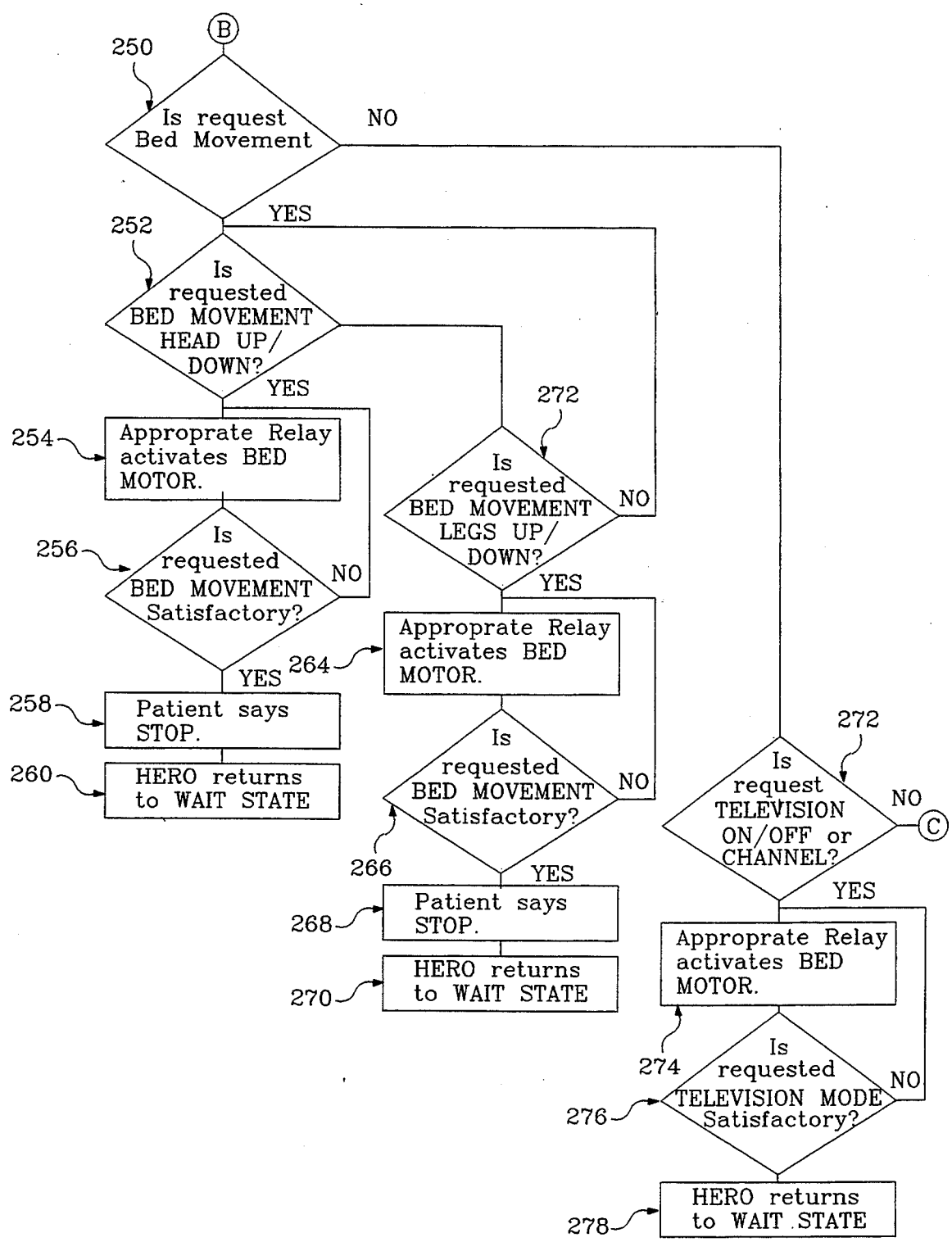
Figure 9D:
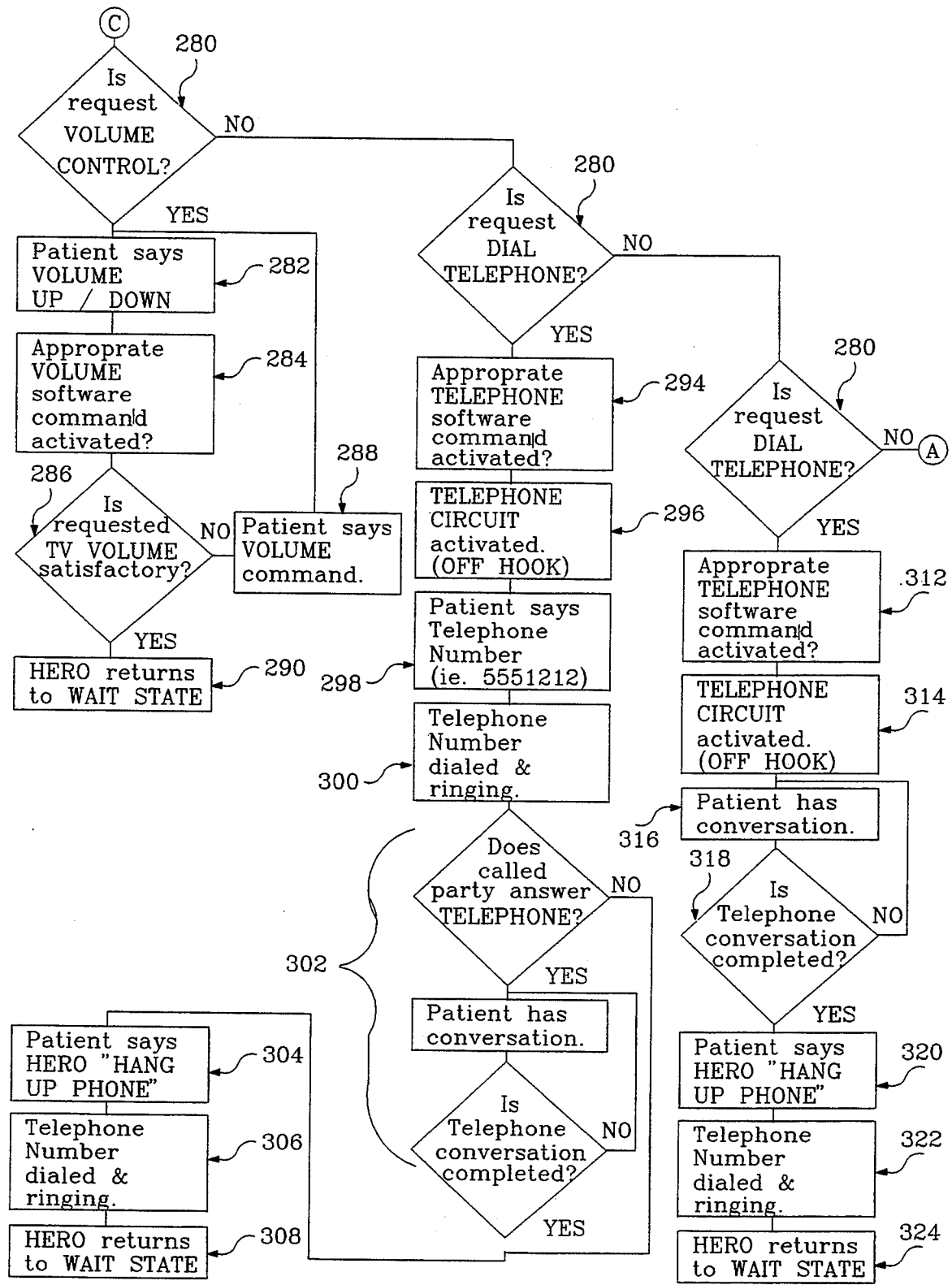

As is seen in FIG. 9C, if a bed movement at 250 is requested, the next question is whether the movement is for head up/down at 252. If either a head up or down adjustment command is issued, RELAY 3 or 4 is activated depending on the command (see FIG. 4B) at 254 until the requested bed movement is satisfactory to the patient at 256. To stop the bed movement, the patient merely needs to say a single word, such as "stop" at 258, after which the H.E.R.O. system returns to its wait state at 260. If the requested bed movement is for legs up/down, then at 262 the patient gives the command "Hero, legs up" or "Hero, legs down" and this signal activates the appropriate RELAY (either RELAY 5 or 6, see FIG. 4A–4B) at 264 to move the leg portion of the bed until satisfactory at 266 where, as before, a "stop" command at 268 switches off the motor (i.e., de-activates RELAY 6), and returns the H.E.R.O. system to its wait state at 270.

Steps 272–278 describe the television on and next channel selection procedure. The TV may be turned on by the "hero TV on" command. And the channels may be changed one at a time by the "hero next channel" command. The appropriate program code changes may be made to the H.E.R.O. system software to achieve alternate methods for changing the TV channels and turning off the TV. The software is preferably written in accordance with the type of TV channel selector system being used in the hospital room. The above described command sequence is particular to the common operational sequence associated with most hospital TV's which operate by a simple on/off and channel select switch, wherein the TV switches off after all channels have been sequentially changed.

At 280, to change the TV volume, the patient gives the appropriate "volume up" or "volume down" command at 282, wherein the H.E.R.O. software transmits and receives at 284 the appropriate volume control signals through the volume control circuit 110 of FIG. 4A. If a volume request is found satisfactory, then at 286 the H.E.R.O. system is directed to return to the wait state its at 290. If further TV volume adjustments are necessary, then at 288 the patient continues the volume command request until a satisfactory volume level is reached through steps 282 through 286, after which the H.E.R.O. system returns to its wait state at 290.

At 292, if the patient wishes to dial out on the telephone, the appropriate voice command is given at 294 (e.g., "hero dial phone"), thus activating RELAY 8 and the telephone circuit (i.e., activating the off hook pin 8 of the telephone interface chip 103 of FIGS. 4A–4B) at 296. The patient then dials the telephone number at 298 by saying aloud each number to signal the telephone interface chip to begin dialing the requested number at 300. Alternatively, emergency or numbers of loved ones may be pre-programmed into the phone and callable by a special word or number learned by the system during voice training.

Once the telephone has dialed and is ringing, the patient uses the headset microphone as the telephone receiver to talk to the person at the other end of the line, just like a normal telephone. As discussed above with reference to FIGS. 4A–4B, a simple conventional audio gain arrangement may be provided to the controller card and responsive the appropriate pin inputs on the telephone interface chip 103 to clean up the signal to an appropriate volume to provide sufficient reception and clarity to the earphones of the headset microphone and caller at the other end. In the alternative, an amplifier circuit may be incorporated into an existing headset microphone, thus obviating the need for a separate amplifier circuit responsive to the telephone interface chip 103 on the controller card 11. Once the phone conversation is complete, the patient hangs up the phone at 304 by giving the appropriate command "Hero, hang up phone". This de-actives RELAY 8 and the phone circuit at 306 by signalling the on hook pin 8 of the telephone interface chip 103 and returns the H.E.R.O. system to its wait state at 308.

Steps 310–324 describe the sequence where the patient uses the H.E.R.O. system to answer the phone. Incoming calls activate the ringer on a provided telephone adjacent the bed to signal to the patient that he/she has a call. The patient then gives to command "hero answer phone" which activates RELAY 8. The telephone circuit is simultaneously activated off hook (pin 8 of chip 103) at 314. The patient then has a normal conversation at 316 wherein, upon completion of the conversation at 318, the patient hangs up at 320 by giving the command "Hero, hang up phone". This de-activates RELAY 8 and the telephone circuit at 322 and returns H.E.R.O. to its wait state at 324.

While this desired verbal command language has been described in simple 2 and 3 word English phrases, it is understood that the commands can be made more complex, if desired, or may even be given in any number of foreign languages or guttural utterances. Flexibility in voice commands is accomplished through the use of speaker dependant voice recognition software.

A program listing by which the controller card 11 is preferably enabled is shown below in Appendix A. The code creates a screen menu program that will allows one to enable the controller through the keyboard. It will be appreciated by those skilled in the art the numerous variations for the code listing are possible to achieve the same or similar command methodology.

A printer (not shown) may be added to the H.E.R.O. system when it is desired to print out a history of patient generated commands. This information is useful in determining the effectiveness of the H.E.R.O. system and for monitoring a particular patient's progress during rehabilitation. Other peripheral add-ons (and appropriate software) may be incorporated into the H.E.R.O. system as desired.

It should also be understood that other various modifications within the scope of this invention can be made by one of ordinary skill in the art without departing from the spirit thereof. For example, while the computer/bed interface is disclosed in the preferred embodiment as being accomplished through the use of direct hardwire connections, it is understood that other means for data communication may be used including known arrangements for external remote controller devices using either infrared transmission and receiving means or radio frequency transmission and receiving means.

It should be noted, however, that radio frequency communication should be restricted to particular room environment control applications such as nursing homes and related health care facilities so as not to interfere with the electronic operation of specialized equipment found in hospitals. I therefore wish my invention to be defined by the scope of the appended claims inview of the specification as broadly as the prior art will permit.

APPENDIX "A"

```
10 KEY OFF
20 S$= STRING$(80,"—")
30 CLS
40 P= 512: OUT P+3, 128
50 DEF FN X(A,B)= (NOT (A) AND B) OR (A AND NOT (B))
60 T= 0 : LOCATE 10,1 : PRINT "ON HOOK"
70 PRINT S$
80 FOR I= 0 TO 7 :LOCATE 12,I*10+1: PRINT "RELAY"I+1;:NEXT
90 FOR I= 0 TO 7 :LOCATE 13,I*10+3: PRINT "OFF";: NEXT : PRINT S$
95 LOCATE 15,10 : PRINT"0              31":PRINT"VOLUME: |":PRINT S$
```

APPENDIX "A"-continued

```
100 DIM A(16,2)
110 DATA 0,94,1,103,2,87,3,55,4,107,5,91,6,59,7,109,8,93,9,61,11,59,12,62
120 FOR I= 0 TO 11 : READ A(I,1), A(I,2) : NEXT I
130 'OUT P+3, 128
140 A$= INKEY$
150 IF A$> ="0" AND A$<="9" THEN OUT P+2, ((PP AND 128) OR A(VAL(A$),2)): PRINT A
$;
160 IF A$="d" THEN LOCATE 10, 20:INPUT"DIAL";D$:PP= INP(P+2) :FOR I= 1 TO LEN(D$
):OUT P+2, ((PP AND 128) OR A(VAL(MID$(D$,I,1)),2)): FOR D= 1 TO 1000: NEXT :OUT
P+2, PP: FOR D= 1 TO 250 : NEXT :NEXT:OUT P+2,PP
170 'IF A$=" " THEN OUT P+1,T AND 63
180 IF A$="o" THEN H= (H+1) AND 1 : IF H= 1 THEN LOCATE 10, 1 : PRINT "OFF HOOK"
; : OUT P+2, 128 ELSE LOCATE 10,1 : PRINT "ON HOOK "; : OUT P+2, 0
190 IF A$<> "r" THEN 210
200 LOCATE 1,1 : PRINT"RELAY # ?";:FOR I= 1 TO 2 STEP 0:A$=INKEY$:IF A$="" THEN
NEXT ELSE LOCATE 1,1 : PRINT "           ";: A= VAL(A$)-1:V= FN X(V,2  A):OUT P+1,V
: IF (V AND 2   A)= 0 THEN LOCATE 13,A*10+3 : PRINT "OFF"; ELSE LOCATE 13, A*10+3
: PRINT "ON";
210 ' V= FN X(2   VAL(A$)) : OUT P,V
220 IF A$="a" THEN L= L-1 ELSE IF A$="s" THEN L= L+1 : IF L> 15 THEN L= 15
225 IF A$ <>"" AND LL= 16 THEN L= 0
230 IF L<0 THEN L= 16
240 IF A$="a" OR A$="s" THEN OUT P+2,L:LOCATE 16,10+LL:PRINT" "; : IF L <> 16
THEN LOCATE 16,10+L : PRINT"|"; : LL= L ELSE LOCATE 16,10 : PRINT "|"; : LL= L
2000 GOTO 140

C: >

C: >
```

PARTS LIST

| | |
|---|---|
| 1. | H.E.R.O. System |
| 10. | Computer |
| 11. | Controller Card |
| 12. | Voice Card |
| 13. | Video Card |
| 14. | DB15 Cable Connector |
| 15. | DB9 Cable Connector |
| 16. | RJ11 Telephone Line |
| 17. | Microphone Line |
| 18. | Nurse Station Cable Connector |
| 19. | Floppy Disk |
| 20. | Hospital Bed |
| 21. | Overhead Light |
| 22. | TV |
| 23. | Nurse Call |
| 24. | Motor |
| 25. | Telephone |
| 26. | Microphone |
| 30. | Nurse Station |
| 31. | Keyboard |
| 32. | Video Monitor |
| 40. | Chassis |
| 41. | Power Supply |
| 42. | Front Panel |
| 43. | Floppy Disk Drive |
| 44. | Cover |
| 45. | 3 Bus Extender Card |
| 56. | Motherboard |
| 47. | LEDs 47a-i |
| 50. | Telephone Amplifier |
| 51. | Line from Amp. to Microphone |
| 54a. | Dsub15 Serial Port |
| 54b. | |
| 55a. | Dsub9 Serial Port |
| 55b. | |
| 56. | Connector |
| 57. | Ribbon Cable |
| 58. | Connector |
| 59. | Ribbon Cable |
| 60. | Telephone Interface Connector |

PARTS LIST -continued

| | |
|---|---|
| 61a. | Keyboard Connector |
| 62. | ¼" Phone Jack |
| 63. | ¼" Phone Jack |
| | Microphone Connector |
| 66. | DB25 Connector |
| 70. | Priority Call & Alarm |
| 77. | Right Side Guard |
| 78. | Left Side Guard |
| 79. | PC Board |
| 80. | DB9 |
| 81a. | |
| 81b. | Dsub25 Connectors |
| 82. | DB12 |
| 85. | Molex Connector Assembly |
| 86. | Molex Receptacle |
| 87. | Molex Plug |
| 101. | Relay Control Switch |
| 102. | Touch Tone Generator |
| 103. | Telephone Interface Chip |
| 110. | TV Volume Circuit |
| 111. | Octal bus Transceiver |
| 112a-e. | Isolator |
| 120. | Amplifier Circuit |

I claim:

1. A voice-actuated speaker-dependent control system for use with a hospital bed having patient related devices of the kind which enable a user-patient to use simple voice commands to control a plurality of said patient-related devices including those in said hospital bed, each of said devices having an activating unit and a switch relay which activates said activating unit of each said device, said voice-activated patient-related device control system having means for acknowledging the receipt of said patient-user's request and comprising in operative combination:

a) a computer disposed in association with said multi-functional hospital bed, said computer including:

i) a monitor, a keyboard, and a motherboard connected to said monitor and said keyboard and comprising a main central processor unit having a floppy-disk drive for a floppy disk and video card for displaying teaching instructions for said patient-user on said monitor;

ii) means for recognizing a patient's voice for transforming a user-patient's voice input into digital information and transmitting said digital information to said motherboard;

iii) a controller card is connected to said motherboard and to said patient-related devices and which functions as an interface between said motherboard and said patient-related devices, said controller card also being connected to said means for recognizing a user-patient's voice; and iv) teaching means for teaching said system to recognize teaching instructions from said user-patient's voice; and b) a headset assembly which is worn by said patient-user, said headset assembly including a microphone for use as a conventional telephone transmitter for transmitting voice input to said means for patient voice recognition and to said floppy disk, and an earphone for use as a conventional telephone receiver for receiving a signal from said means for acknowledging said patient-user's request.

2. The system of claim 1 wherein said teaching means comprises a program stored in said floppy disk and displayed on said monitor via said video card.

3. The system of claim 2 wherein said means for recognizing a user-patient's voice comprises a voice-recognition card connected to said headset assembly and to said motherboard.

4. The system of claim 3 wherein one of said patient-related devices is a telephone, said controller card comprises a plurality of indicating means for indicating the condition of said switch relay, and including a telephone amplifier for amplifying signals of said telephone, each of said indicating means being connected to a relay of said patient-related device associated with said relay.

5. The system of claim 4 wherein said controller card further includes a first input connection element for connection to a first computer bus and two computer output serial ports and a telephone jack for connecting said telephone amplifier to said telephone.

6. The system of claim 5 wherein, apart from said multi-functional hospital bed and said telephone functions, said patient-related devices comprise at least one device selected from the group consisting of a nurse-call device, a bed light, a bed-movement motor control, and a television set with control of volume, channel, and on-off functions.

7. The system of claim 5 wherein said voice-recognition card comprises a second input connection element for connecting to a second computer bus; a microphone receiver jack connected to said microphone of said headset; and an analog-to-digital converter between said headset and said second computer bus.

8. The system of claim 7 wherein said means for acknowledging the receipt of said patient-user's request comprises sound producing means connected to said motherboard.

9. A voice-actuated control system consisting of patient-related devices of the kind which enable a user-patient to use simple voice commands to control a plurality of patient-related devices, including a multi-functional hospital bed, each of said devices having a drive mechanism and a switch relay which activates said drive mechanism of each said device, said voice activated patient-related device control system having sound producing means for acknowledging the receipt of said patient-user's request and comprising in operative combination:

a) a computer disposed in association with said multi-functional hospital bed, said computer including:

i) a monitor, a keyboard, and a motherboard connected to said monitor and said keyboard and comprising a main central processor unit having a floppy-disk drive for a floppy disk and video card for displaying teaching instructions for said patient-user on said monitor;

ii) means for recognizing a patient's voice for transforming a user-patient voice input into digital information and transmitted to said motherboard, said means for recognition comprising a voice-recognition card which is connected to said headset assembly and to said motherboard;

iii) a controller card is connected to said motherboard and to said patient-related devices and which functions as an interface between said motherboard and said patient-related devices, said controller card being connected to said voice-recognition card; one of said patient-related device being a telephone, said controller card comprising a plurality of light-emitting diodes for indicating the condition of said switch relay, a telephone amplifier for amplifying signals of said telephone, each said light-emitting diodes being connected to a relay of said patient-related device associated with said relay; and iv) teaching means for teaching said system to recognize a set of predetermined commands pronounced in the voice of said patient user; and b) a headset assembly which is worn by said patient-user, including a microphone for use as a conventional telephone transmitter for transmitting voice input to said voice recognition card and to said floppy disk, and an earphone for use as a conventional telephone receiver for receiving a signal from said means for acknowledging said patient-user's request.

10. The system of claim 9 wherein said teaching means comprises a program stored in said floppy disk and displayed on said monitor via said video card.

11. The system of claim 10 wherein said controller card further includes a first input connection element for connecting to a first computer bus and two computer output serial ports and a telephone jack for connecting said telephone amplifier to said telephone.

12. The system of claim 11 wherein, apart from said multi-functional hospital bed and said telephone, said patient-related devices include at least a nurse-call device, a bed light and a television set with control of volume, channel, and on-off functions.

13. The system of claim 12 wherein said voice-recognition card comprises: a second input connection element for connecting to a second computer bus; a microphone receiver jack connected to said microphone of said headset; and an analog-to-digital converter between said headset and said second computer bus.

14. A method of controlling patient-related devices by user-patient voice commands, including operating a multi-functional hospital bed, comprising in any operative sequence the steps of:

a) providing a multi-functional hospital bed having a plurality of associated patient-related devices, means for activating said patient-related devices, said patient related devices being responsive to voice commands, a headset comprising a microphone and an earpiece worn by a patient, a computer with a memory, a keyboard, a monitor, and an analog-to-digital converter for converting voice commands to digital signals, said computer having voice-recognition means for recognizing a set of predetermined voice commands of said patient, said computer having a floppy disk with reaching means for enabling said user-patient to teach said computer through said voice-recognition card to store and recognize said predetermined voice commands;

b) teaching said computer to store and recognize said predetermined voice commands by entering into said memory of said computer a set of predetermined voice commands by said user-patient who pronounces said commands through said microphone by repeating the teaching instructions shown on said monitor form said floppy disk;

c) disconnecting and removing said monitor and said keyboard from said computer after the completion of said teaching step;

d) storing said digital signals in said memory and backing up said digital signals in said floppy disk; and e) selectively activating said patient-related devices by said patient selectively pronouncing said predetermined voice commands through the use of said microphone and said voice card without the use of said monitor and said keyboard.

15. The method of claim 14 wherein said patient-related devices include at least a hospital bed, a telephone, a bed light, a nurse call, and television set.

16. The method of claim 14 wherein said computer further includes:

a) a motherboard which contains said memory and is connected to said monitor and said keyboard and comprises a main central processor unit having a floppy disk drive for said floppy disk, and video card for displaying said teaching instructions for said user-patient on said monitor; said voice recognition means comprising a voice recognition card which is connected to said headset and to said motherboard; and b) a controller card which is connected to said mother board and to said patient related devices and which functions as an interface between said motherboard and said patient-related devices, said controller card being connected to said voice-recognition card, said controller card having a telephone amplifier.

17. The system of claim 16 wherein said controller card further includes a first input connection element for connection to a first computer bus and two computer output serial ports and a telephone jack for connecting said telephone amplifier to said telephone.

18. The system of claim 17 wherein said voice-recognition card comprises a second input connection element for connecting to a second computer bus; a microphone receiver jack connected to said microphone of said headset; and said analog-to-digital converter between said headset and a second computer bus.

19. A voice-actuated speaker-dependent control system for use with a hospital bed having patient-related devices of the kind which enable a user-patient to use simple voice commands to control, a plurality of patient-related devices, including those in said hospital bed, each of said devices having an activating unit and a switch relay which actives said activating unit of each said device, said voice-activated patient-related device control system having means for acknowledging the receipt of said patient-user's request and comprising in operative combination:

a) a computer which is disposed in association with said multi-functional hospital bed, said computer has:

i) a motherboard which contains a central processor unit with built-in memory;

ii) a floppy-disk drive and a floppy disk which stores said simple voice commands of said user-patient and an operating program for said control system, said operating program including reaching instructions, said floppy disk drive being connected to said motherboard;

iii) a video card connected to said motherboard;

iv) a controller card which is connected to said motherboard and said patient-related devices and functions as an interface between said motherboard and said patient-related devices;

v) a voice recognition card for the recognition of said simple voice commands to transform said simple voice commands into digital-information transmitted to said motherboard under commands of said operating program, said voice commands consisting of teaching commands and operating commands; and vi) a headset assembly which is worn by said patient-user including a microphone for use as a conventional telephone transmitter and for transmitting said simple voice commands to said voice recognition card and to said floppy disk, and an earphone for use as a conventional telephone receiver and means for receiving a signal from said means for acknowledging said patient-user's request.

20. The system of claim 19, further including a plurality of removable parts which are used only during teaching said computer to recognize said simple voice commands, said plurality of removable parts comprising a monitor for displaying teaching instructions to said user patient, said monitor being connected to said video card, and a keyboard connected to said computer for entering said teaching instruction to said computer during said teaching for activating said operation program.

21. The system of claim 20 wherein said voice-recognition card is connected to said headset assembly and to said motherboard.

22. The system of claim 21 wherein one of said patient-related devices is a telephone, said controller card comprising a plurality of indicating means for indicating the conditions of said switch relays, a telephone amplifier for amplifying signals of said telephone, each said indicating means being connected to a relay of said patient-related device associated with said relay.

23. The system of claim 22 wherein said controller card further includes a first input connection element for connection to a first computer bus and two computer output serial ports and a telephone jack for connecting said telephone amplifier to said telephone.

24. The system of claim 23 wherein, apart from said multi-functional hospital bed and said telephone functions, said patient-related devices comprise at least one device selected from the group consisting of a nurse-call device, a bed light, a bed-movement motor control, and a television set with control of volume, channel, and on-off functions.

25. The system of claim 23 wherein said voice-recognition card comprises a second input connection element for connecting to a second computer bus; a microphone receiver jack connected to said microphone of said headset; and an analog-to-digital converter between said headset and said second computer bus.

26. The system of claim 25 wherein said means for acknowledging the receipt of said patient-user's request comprises sound producing means connected to said motherboard.

* * * * *